(12) United States Patent
Knoll et al.

(10) Patent No.: US 12,320,567 B1
(45) Date of Patent: Jun. 3, 2025

(54) HEAT PUMP SYSTEMS UTILIZING DISTRIBUTED CONTROL SYSTEMS

(71) Applicant: Quilt Systems, Inc., Redwood City, CA (US)

(72) Inventors: Matthew Aaron Knoll, Redwood City, CA (US); Gwendolyn Willemijn van der Linden, Redwood City, CA (US)

(73) Assignee: Quilt Systems, Inc., Redwood City, CA (US)

( * ) Notice: Subject to any disclaimer, the term of this patent is extended or adjusted under 35 U.S.C. 154(b) by 0 days.

(21) Appl. No.: 18/662,896

(22) Filed: May 13, 2024

(51) Int. Cl.
*F25B 49/02* (2006.01)
*F25B 30/02* (2006.01)

(52) U.S. Cl.
CPC .............. *F25B 49/02* (2013.01); *F25B 30/02* (2013.01)

(58) Field of Classification Search
CPC ................................. F25B 49/02; F25B 30/02
See application file for complete search history.

(56) References Cited

U.S. PATENT DOCUMENTS 5,499,510 A * 3/1996 Yoshida ................... F24F 11/52
236/51
5,752,047 A * 5/1998 Darty ................ H02J 13/00016
713/300

FOREIGN PATENT DOCUMENTS

JP     2007085642 A   *  4/2007

OTHER PUBLICATIONS

Shimogama et al., Air Conditioning Control Device, Apr. 5, 2007, JP2007085642A, Whole Document (Year: 2007).*
Carrascal et al., "Model Predictive Control for the heating system of a public building," Presented at 2014 World Automation Congress (WAC), Waikola, Hawaii, Aug. 3-7, 2014, pp. 433-438.
Ecobee.com [online], "Thermostat features," available on or before Sep. 2021, retrieved on May 31, 2024, retrieved from URL: <https://www.ecobee.com/en-us/smart-thermostats/#Features>, 14 pages.
Gouda et al., "Low-order model for the simulation of a building and its heating system," Building Services Engineering Research & Technology, Aug. 2000, 21(3):199-208.
Lee et al., "Mixed-Integer Model Predictive Control of Variable-Speed Heat Pumps," Energy and Buildings, Sep. 2019, 189:75-83.

(Continued)

*Primary Examiner* — Larry L Furdge
(74) *Attorney, Agent, or Firm* — Fish & Richardson P.C.

(57) ABSTRACT

Heat pump systems, control systems for heat pumps, and methods of controlling heat pumps utilizing distributed control techniques are described herein. Examples of the control systems include multiple control devices distributed amongst a heat pump system. A first of the control devices is configured as a main control device to execute a model predictive control algorithm for the heat pump system. The other, remaining control devices are configured as a shadow control system to monitor the first control device. If a fault or failure occurs in the first control device, the shadow control system elects and initializes a second of the control devices as the main control device to continue executing the model predictive control algorithm uninterrupted. This allows the control system to dynamically react to faults or failures at any one part of the heat pump system while maintaining full operation of the functional parts.

20 Claims, 14 Drawing Sheets

(56) References Cited

OTHER PUBLICATIONS

Mitsubishicomfort.com [online], "3D i-See Sensor® Technology," available on or before Apr. 2023, retrieved on May 31, 2023, retrieved from URL: <https://www.mitsubishicomfort.com/node/52>, 2 pages.

Stewart et al., "Smart Thermostat Evaluation Protocol," NREL, Dec. 2016-May 2023, 51 pages.

Store.google.com [online], "Nest Learning Thermostat", available on or before Jul. 2019, retrieved on May 31, 2024 retrieved from URL: <https://store.google.com/product/nest_learning_thermostat_3rd_gen?hl=en-US>, 22 pages.

Support.google.com [online], "What you'll see on a Nest thermostat—Time-to- temperature," available on or before Sep. 2023 via Internet Archive: Wayback Machine, retrieved on May 31, 2024, retrieved from URL: <https://web.archive.org/web/20230923121437/https://support.google.com/googlenest/answer/9243193?hl=en>, 14 pages.

Support.google.com, "Early-On," Nest Thermostat, available on or before Nov. 2020, retrieved on May 31, 2024, retrieved from URL: <https://support.google.com/googlenest/answer/9246532?hl-en>, 1 page.

Yao et al., "A state-space model for dynamic response of indoor air temperature and humidity," Building and Environment, Jun. 2013, 64:26-37.

Youtube.com, "3D i-See Sensor Technology," Mitsubishi Electric Trane US, Aug. 6, 2020, retrieved on May 3, 2024, retrieved from URL: <https://www.youtube.com/watch?v=H4HOFik83VI>, 2 pages.

\* cited by examiner

HEAT PUMP SYSTEMS UTILIZING DISTRIBUTED CONTROL SYSTEMS

TECHNICAL FIELD

This specification relates generally to heat pump systems, control systems for heat pumps, and methods of controlling heat pumps utilizing distributed control techniques.

BACKGROUND

Heat pumps are devices that can perform work to transfer thermal energy from a cool space to a warm space using a thermodynamic cycle.

SUMMARY

This specification describes heat pump systems, control systems for heat pumps, and methods of controlling heat pumps utilizing distributed control techniques.

The heat pump systems described herein include a set of one or more heat pumps, multiple sensors, and a control system for controlling the set of heat pumps.

In general, the set of heat pumps is configured to transfer thermal energy to or from each of one or more indoor spaces, and the sensors are configured to collect status information of each of the indoor space(s). The sensors may also collect status information of an outdoor space and/or each heat pump in the set.

Each heat pump can include: (i) an outdoor unit (ODU) for transferring thermal energy to or from an outdoor space, (ii) and one or more indoor units (IDUs) for transferring thermal energy to or from one or more of the indoor space(s). A single-zone heat pump is a heat pump that includes a single IDU thermally coupled to an ODU, and a multi-zone heat pump is a heat pump that includes multiple IDUs thermally coupled to an ODU. Each heat pump can be configured to transfer thermal energy from its ODU to its IDU(s), and vice versa, by circulating a working fluid (e.g., a refrigerant or gas) in a thermodynamic cycle (e.g., a vapor-compression or gas cycle) in accordance with a control sequence computed by the control system, thereby heating or cooling each of the indoor space(s) according to the control sequence.

The status information collected by the sensors can include data characterizing a current state of the indoor space(s), e.g., including a respective current temperature, humidity, and occupancy of each indoor space. The status information can also include data characterizing a current state of the outdoor space, e.g., including a current ambient temperature and humidity of the outdoor space. The status information may also include data characterizing a current state of the set of heat pumps, e.g., including a respective current temperature, pressure, and flow rate of the working fluid at each of one or more thermodynamic points in the thermodynamic cycle implemented by each heat pump.

At each time step in the control sequence, the control system can receive the status information at the current time step and compute an optimal control input for the set of heat pumps at the current time step. For example, the optimal control input can specify an optimal speed of each heat pump in the set, e.g., compressor and fan speeds of the heat pump, that optimize energy use and heat output of the set of heat pumps throughout the control sequence. The control system can determine the optimal control sequence that satisfies several desired features and constraints simultaneously, such as maximizing the efficiency of the set of heat pumps, tracking a temperature, humidity, and/or occupancy schedule of the indoor space(s), tracking a reference control sequence for the set of heat pumps, minimizing fluctuations in the temperature, humidity, and/or control values (e.g., for occupant comfort), reducing energy costs (e.g., due to peak pricing) of the heat pump system, adapting to weather forecasts, among other features.

In the described examples, the control system is a distributed control system including multiple control devices communicatively coupled to one another. A first of the control devices is initially configured, e.g., assigned by a user, randomly selected, or elected, as a main control device to independently compute the optimal control sequence for the set of heat pumps. The remaining control devices are configured as a shadow control system to monitor health status information of the first control device and intervene if the first control device malfunctions, has a high frequency of faults (e.g., static, or dynamic faults), or goes offline. The shadow control system runs one or more shadow copies of the first control device to stay synchronized with the first control device and, in the event of fault or failure of the first control device, elects a second, different control device from the shadow control system to be configured as the main control device. The shadow control system then initializes the second control device with a shadow copy of the first control device, e.g., corresponding to the current configuration of the main control device, to continue computing the optimal control sequence for the set of heat pumps uninterrupted. The remaining control devices of the shadow control system can then repeat this procedure for the second control device. This allows the control system to dynamically react to faults or failures at any part of the heat pump system while still maintaining functionality of the rest of the heat pump system.

These and other features related to the heat pump systems, the control systems for heat pumps, and the methods of controlling heat pumps described herein are summarized below.

In one aspect, a heat pump system is described. The heat pump system includes: a set of heat pumps configured to transfer thermal energy to or from each of one or more spaces in accordance with a respective control input at each of multiple time steps; multiple sensors configured to collect status information of each of the one or more spaces over the time steps; and a control system including multiple control devices communicatively coupled with one another, the set of heat pumps, and the sensors. A first of the control devices is configured as a main control device, where the main control device is configured to, at each of the time steps: receive the status information at the current time step; compute the control input at the current time step based, at least in part, on the status information at the current time step; and transmit the control input at the current time step. A subset of the control devices is configured to: monitor health status information of the first control device over the time steps; and at each of the time steps: determine whether the health status information at the current time step indicates a fault or failure of the first control device; and if so, elect a second of the control devices to be configured as the main control device.

In some implementations of the heat pump system, the main control device is further configured to obtain a system model including a thermal model of the one or more spaces, and at each of the time steps, computing the control input at the current time step based, at least in part, on the status information at the current time step includes: computing the control input at the current time step based, at least in part, on the thermal model and the status information at the current time step.

In some implementations of the heat pump system, the thermal model characterizes a state of the one or more spaces at a sequential time step in response to: (i) a state of the one or more spaces at a given time step, and (ii) a given control input for the set of heat pumps at the given time step, and at each of the time steps, computing the control input at the current time step based, at least in part, on the thermal model and the status information at the current time step includes: determining, from the status information at the current time step, a state of the one or more spaces at the current time step; predicting, using the thermal model, a respective state of the one or more spaces at each of one or more future time steps in response to: (i) the state of the one or more spaces at the current time step, and (ii) a respective given control input for the set of heat pumps at each of the current and future time steps; generating a cost function that depends on the states of the one or more spaces and given control inputs at each of the current and future time steps; and minimizing the cost function with respect to the given control inputs at each of the current and future time steps to determine the control input at the current time step.

In some implementations of the heat pump system, the main control device is further configured to: receive a reference state trajectory including a respective reference state of the one or more spaces for each of the time steps, and at each of the time steps: the cost function includes, for each of the current and future time steps, a respective error between: (i) the respective state of the one or more spaces, and (ii) the respective reference state of the one or more spaces, at the current or future time step.

In some implementations of the heat pump system, the main control device is further configured to: receive a reference control sequence including a respective reference control input for each of the time steps, and at each of the time steps: the cost function includes, for each of the current and future time steps, a respective error between: (i) the respective given control input, and (ii) the respective reference control input, at the current or future time step.

In some implementations of the heat pump system, at each of the time steps, the cost function further includes a terminal cost term that depends on the state of the one or more spaces at a terminal future time step.

In some implementations of the heat pump system, the main control device is further configured to, at each of the time steps: log the status information and control input at the current time step.

In some implementations of the heat pump system, the subset of the control devices includes each of the control devices except the first control device.

In some implementations of the heat pump system, each control device in the subset is configured to: monitor a respective portion of the health status information of the first control device over the time steps; and at each of the time steps: determine whether the respective portion of the health status information at the current time step indicates a fault or failure of the first control device.

In some implementations of the heat pump system, the subset of the control devices is further configured to: run one or more shadow copies of the first control device over the time steps; and at each of the time steps: if the health status information at the current time step indicates a fault or failure of the first control device, initialize the second control device with a shadow copy of the first control device at the current time step.

In some implementations of the heat pump system, each control device in the subset is configured to run a respective shadow copy of the first control device over the time steps.

In some implementations of the heat pump system, each control device in the subset is configured to run a respective portion of a shadow copy of the first control device over the time steps.

In some implementations of the heat pump system, each of the control devices is configured to, at each of the time steps: receive, from one or more of the sensors, a respective portion of the status information at the current time step; and if the control device is not the first control device: transmit, to the first control device, the respective portion of the status information at the current time step.

In some implementations of the heat pump system, each of the control devices is configured to, at each of the time steps: transmit, to one or more heat pumps in the set, a respective portion of the control input at the current time step; and if the control device is not the first control device: receive, from the first control device, the respective portion of the control input at the current time step.

In some implementations of the heat pump system, the control devices are further configured to, before the first control device is configured as the main control device, perform one of the following operations: receiving, from a user control, a user input assigning the first control device to be configured as the main control device; randomly selecting the first control device to be configured as the main control device; or electing the first control device to be configured as the main control device.

In some implementations of the heat pump system, the subset of the control devices is configured to implement a voting system when electing the second control device to be configured as the main control device.

In some implementations of the heat pump system, the voting system is a ranked voting system.

In some implementations of the heat pump system, the ranked voting system satisfies a Condorcet criterion.

In some implementations of the heat pump system, implementing the ranked voting system includes: for each control device in the subset: ranking each other control device in the subset based on a quality of a respective communication channel of the other control device with the control device; and determining, from the respective rankings of each control device in the subset, a respective aggregate rank of each control device in the subset; and electing, to be configured as the main control device, the control device in the subset having the highest aggregate rank.

In some implementations of the heat pump system, each communication channel is a wireless communication channel.

In some implementations of the heat pump system, each of the one or more spaces is an indoor space.

In some implementations of the heat pump system, the one or more indoor spaces are multiple indoor spaces adjacent to one another.

In some implementations of the heat pump system, the indoor spaces are part of a single dwelling.

In some implementations of the heat pump system, each heat pump in the set includes: one or more indoor units each configured to transfer thermal energy to or from one of the indoor spaces; and an outdoor unit thermally coupled to the one or more indoor units, the outdoor unit configured to transfer thermal energy to or from an outdoor space.

In some implementations of the heat pump system, for each heat pump in the set: each of the one or more indoor units of the heat pump includes a respective indoor heat exchanger, and the outdoor unit of the heat pump includes an outdoor heat exchanger, a variable-speed compressor, and a reversing valve.

In some implementations of the heat pump system, each heat pump in the set further includes a respective electronic expansion valve for each of the one or more indoor units of the heat pump.

In some implementations of the heat pump system, each of the control devices is housed in a corresponding one of the indoor units of the set of heat pumps.

In some implementations of the heat pump system, the set of heat pumps is a singleton set.

In a second aspect, a control system for a set of heat pumps is described. The set of heat pumps is configured to transfer thermal energy to or from each of one or more spaces in accordance with a respective control input at each of multiple time steps. The control system includes multiple control devices communicatively coupled with one another. A first of the control devices is configured as a main control device, where the main control device is configured to, at each of the time steps: receive status information characterizing each of the one or more spaces at the current time step; compute the control input at the current time step based, at least in part, on the status information at the current time step; and transmit the control input at the current time step. A subset of the control devices is configured to: monitor health status information of the first control device over the time steps; and at each of the time steps: determine whether the health status information at the current time step indicates a fault or failure of the first control device; and if so, elect a second of the control devices to be configured as the main control device.

In some implementations of the control system, the subset of the control devices is further configured to: run one or more shadow copies of the first control device over the time steps; and at each of the time steps: if the health status information at the current time step indicates a fault or failure of the first control device, initialize the second control device with a shadow copy of the first control device at the current time step.

In a third aspect, a method performed by a control system for a set of heat pumps is described. The set of heat pumps is configured to transfer thermal energy to or from each of one or more spaces in accordance with a respective control input at each of multiple time steps. The control system includes multiple control devices communicatively coupled with one another. The method includes: configuring a first of the control devices as a main control device, where the main control device is configured to, at each of the time steps: receive status information characterizing each of the one or more spaces at the current time step; compute the control input at the current time step based, at least in part, on the status information at the current time step; and transmit the control input at the current time step; monitoring health status information of the first control device over the time steps; and at each of the time steps: determining whether the health status information at the current time step indicates a fault or failure of the first control device; and if so, electing a second of the control devices to be configured as the main control device.

In some implementations of the method, the method further includes: running one or shadow copies of the first control device over the time steps; and at each of the time steps: if the health status information at the current time step indicates a fault or failure of the first control device, initializing the second control device with a shadow copy of the first control device at the current time step.

Particular embodiments of the subject matter described in this specification can be implemented so as to realize one or more of the following advantages.

Dwellings that are heated or cooled using more than one independently controlled heating, ventilation, and air conditioning (HVAC) unit allow for conditioning individual spaces or groups of spaces in a dwelling to separate setpoints. However, current HVAC systems typically meet these setpoints separately-they do not explicitly consider the efficiency and operational limitations of each individual HVAC unit in achieving the best overall outcome when looking at the dwelling as a whole.

As one example, a multi-zone heat pump is a heat pump including multiple indoor units (IDUs) thermally coupled to a single outdoor unit (ODU). The energy efficiency of the multi-zone heat pump depends on how each of the IDUs are operated. Two IDUs operated sequentially may be more efficient than operating them simultaneously, even though each IDU generally delivers the same average amount of heating or cooling to a space.

As another example, the desired temperature for a space may be a temperature band rather than a single setpoint, affording a control system some freedom in how individual spaces are conditioned. It may be beneficial to cool a ground floor to the minimum of the allowable temperature band, to help cool down an upper floor that is seeing a high solar gain.

As yet another example, a property owner may wish to participate in a demand-response program where the utility can dictate the maximum power that the home may use, requiring coordination of all HVAC units to collectively stay below that maximum power limit, while meeting the comfort requirements for each conditioned space as well as possible.

As yet another example, a user may wish to control the combined system in a more holistic and intuitive manner that is less granular than the individual HVAC units. For example, a large space such as a great room served by a heat pump system may involve conditioning from more than one IDU, while the user simply wishes to control the temperature of the whole space and not have to control the IDUs individually.

Finally, a solution to this problem should be robust, in that it can handle malfunction or shutdown of a part of the HVAC system and still provide the maximum amount of control over and use of the functional part of the system. For example, each IDU may have a control device that can participate in computing the most energy efficient manner of conditioning a home for the next 24 hours, and unavailability of one or more of the IDUs and their control unite should not hamper the rest of the system. Similarly, the HVAC system should remain available to user inputs as long as part of the system remains functional, provide the maximum amount of control over the functioning part of the system, and maximum amount of information on both the functioning and non-functioning parts of the system.

To overcome some, or all, of these abovementioned challenges, this specification introduces heat pump systems, control systems for heat pumps, and methods of controlling heat pumps utilizing distributed control techniques. The control systems described herein include multiple control devices, where one of the control devices is configured as a main control device and the other, remaining control devices are configured as a shadow control system.

In general, the main control device is responsible for controlling the conditioned spaces in a building, dwelling, or assembly of dwellings (e.g., a property with a main house and an accessory dwelling unit (ADU)), by monitoring and controlling a set of heat pumps and communicating between user controls, e.g., peripherals such as mobile user devices and (smart) thermostats. The main control device monitors the overall functionality and health of the heat pumps, responds to status information collected by sensors of the system, responds to user inputs from one or more users of the system, external inputs such as weather information or demand-response events, and determines the appropriate control information for the heat pumps. The main control device can also log the control and status information generated by the heat pump system to provide a current and historical state of the system.

The shadow control system runs one or more shadow copies of the control device currently configured as the main control device, thereby remaining synchronized with the control device. In the event the control device currently configured as the main control device malfunctions or shuts down, the shadow control system elects a new control device to be configured as the main control device. The shadow control system can implement a voting system to elect the new control device, e.g., based on the quality of a communication channel (e.g., a wireless communication channel such as Wi-Fi or Bluetooth) to elect the control device that has the best connection to all the control devices in the shadow control system. Moreover, since each shadow copy includes a log of the control and status information of the heat pump system, i.e., the historical state of the system, they can provide information on parts of the system that are currently down, e.g., errors that were logged before a part of the system fatally failed.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
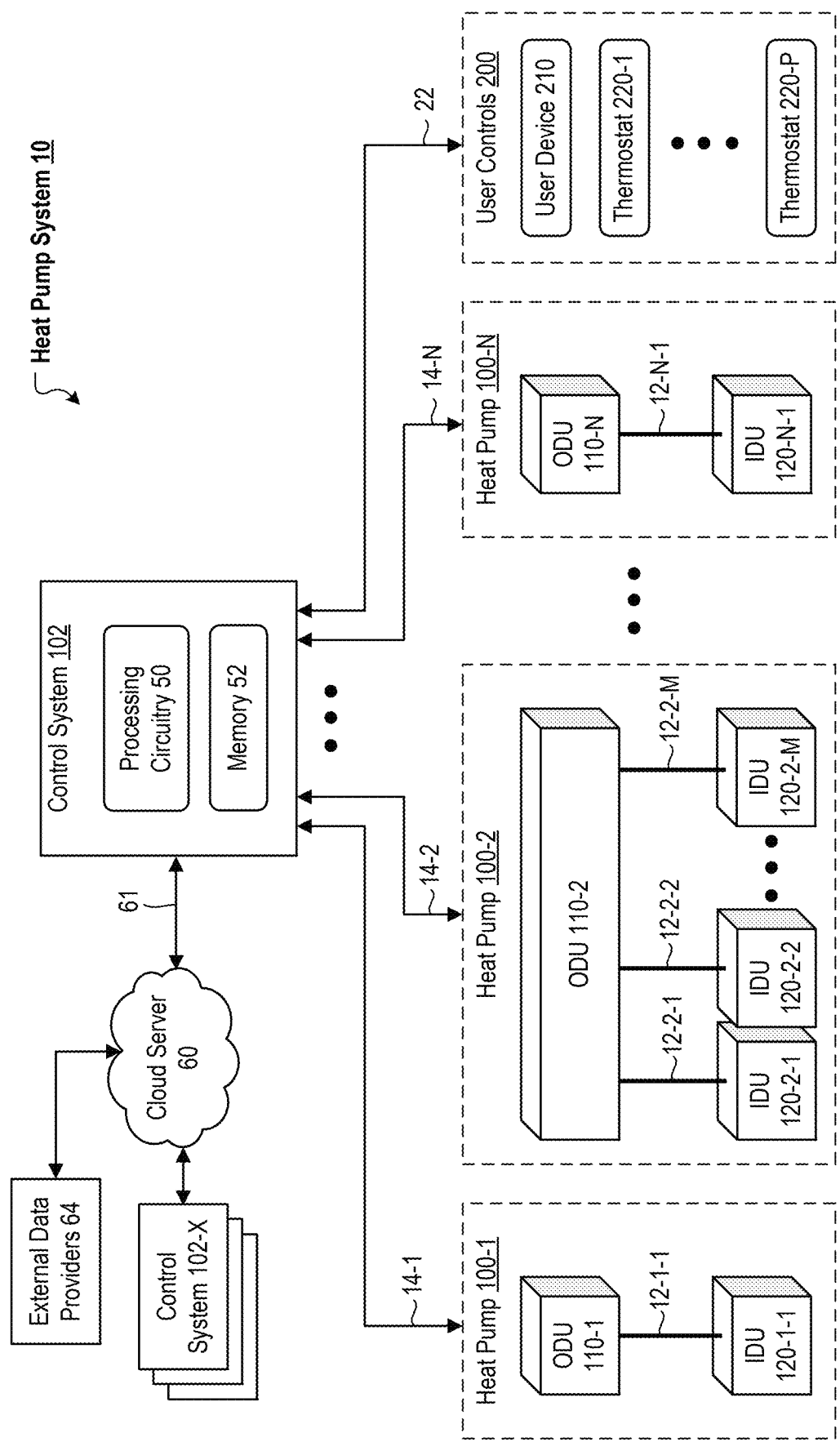
FIG. 1 is a schematic diagram depicting an example of a heat pump system including a set of heat pumps and a control system.

In recent trends, variable-speed heat pumps are increasingly being used for heating and cooling spaces in a residence. They provide a more efficient means to heat a home compared to existing fuel-based systems. For cooling, they can improve upon the efficiency of existing single- or two-speed air conditioning (AC) systems. Also, ductless heat pump systems and multi-zone heat pump systems can provide dedicated conditioning for each space, allowing independent temperature control.

A notable property of variable-speed heat pumps is that their thermal output and efficiency depends, at least in part, on the compressor speed, indoor and outdoor heat exchanger fan speeds, and indoor and outdoor temperature and humidity. Typically, running a heat pump system at full capacity or too low of capacity is less efficient, e.g., as measured by the total thermal output of the system as a function of energy use, or in terms of the coefficient of performance (COP) of the system. Ductless heat pump systems may have multiple indoor units (IDUs) connected to a single outdoor unit (ODU), such that the efficiency of one IDU depends on the operation and conditions of the other IDUs. Also, ODUs typically have a minimum capacity they should (or need) to run at, e.g., about 30% of maximum capacity. When a lower capacity is desired, they often need to 'short-cycle', e.g., turn the heat pump system on and off periodically to push the mean capacity below the minimal capacity, which decreases energy efficiency. Moreover, the amount of heating or cooling involved for a specific residence is different for each residence and the spaces within the residence. The spaces within a residence may also be thermally coupled to one another. For example, aggressive heating of the downstairs rooms of a residence may cause overheating of the upstairs rooms of the residence. Existing heat pump systems generally do not account for these various confounding factors and, therefore, have suboptimal efficiency.

Existing heat pump systems generally have a basic temperature control loop that runs on low-cost, low-performance central processing units (CPUs) built into the heat pump system. The remote controls or thermostats may send a temperature setpoint to the existing temperature control loop. Third-party smart thermostats, which may have additional sensors and the computing performance to execute more sophisticated algorithms, generally do not know the specifications of the interconnected heat pump system, nor do they have access to real-time status information characterizing the operation of the interconnected heat pump system. Therefore, current approaches generally do not allow for integrated smart algorithms that can proactively, gently, and efficiently condition spaces based on known properties of the heat pump system, current and future conditions of the heat pump system, and known properties of the spaces being heated and cooled by the heat pump system.

Existing multi-zone residential heat pump systems generally only run in heating or cooling mode, and a user typically must manually select heating or cooling. In situations where an 'auto' mode is provided, existing heat pump systems typically select either heating or cooling modes based on the zone with the greatest need. They generally do not automatically and optimally schedule between modes to service all the connected spaces. Additionally, when more than one IDU is installed in a space, it is typically up to the user to control each IDU. Existing heat pump systems generally do not automatically balance between IDUs, nor do they let the user holistically control the space.

Moreover, heat pump systems running in cooling mode may remove moisture from the indoor air through condensation on a condenser coil, directing the condensation fluid outdoors. Typically, a user needs to manually select a "drying mode" to reduce the humidity of a space. Dedicated dehumidification systems do this automatically, but existing heat pump systems designed for heating and cooling do not, even though they are physically capable of dehumidification.

Further still, when considering energy usage, the price of energy (e.g., electricity) may depend on the time of day and/or total energy consumed over a period of time (e.g., tier-based tariffs). A user of a heat pump system may wish to minimize the cost of conditioning their home. Existing heat pump systems, such as those including smart thermostats that can enroll in so-called demand-response programs, do not explicitly measure and optimize over the actual energy used and instead apply general rules in attempt to minimize energy consumption. Consequently, existing heat pump systems do not run as efficiently as they could nor do they automatically support all features—to utilize these existing systems more efficiently, the burden is on the user. Users typically need to set up efficient temperature setpoint schedules for each space, adjust them as space occupancy schedules change, and override them diligently by manually adjusting the temperature setpoint when spaces become occupied (or unoccupied) outside of the occupancy schedule. Additionally, they need to gently increase or decrease the temperature setpoint to avoid running the heat pump system at an inefficient higher capacity. This is not a reasonable task, and results in user burden, reduced energy efficiency, and/or reduced comfort.

To overcome some, or all, of these abovementioned challenges, this specification introduces heat pump systems, control systems for heat pumps, and methods of controlling heat pumps utilizing distributed control techniques.

The heat pump systems described herein include a set of one or more heat pumps for conditioning one or more indoor spaces, multiple sensors for collecting status information of the heat pump system, and a control system for controlling the set of heat pumps based on the status information. In the described examples, the control system is a distributed control system including multiple control devices. The control devices are segmented into: (i) a control device currently configured as a main control device for controlling the set of heat pumps (e.g., by executing a model predictive control algorithm), and (ii) a shadow control system for monitoring health status information of the control device currently configured as the main control device (e.g., by running one or more shadow copies of the control device).

Among other features, a heat pump system as described herein can be implemented so as to realize one or more of the following novel aspects.

The heat pump system can be used to maintain the humidity levels in a space within a desired range, without the need for a dedicated drying mode. For example, the control system can use a detailed thermal model of the space which predicts the moisture removal rate of an IDU as a function of controllable and uncontrollable inputs. The control system can exploit the freedom in control inputs to select an operating condition that provides the desired moisture removal rate, e.g., to achieve a certain setpoint humidity for the space.

The heat pump system can improve comfort and sleep quality of occupants by correlating information received from peripheral user controls such as wearable technology, and adjusting, for example, the setpoints for temperature, humidity, air flow, and air flow direction (e.g., louver angles).

The heat pump system can balance the operation of multiple IDUs and ODUs to produce a similar outcome as if each were operated individually, but with lower energy consumption and/or cost.

The heat pump system can switch between heating and cooling modes for the ODU(s) over time, to allow for heating one space and cooling another, without user intervention. The heat pump system may recover some of the thermal energy stored in the system when switching between heating and cooling modes to cool one space and heat another, e.g., the heat stored in an outdoor heat exchanger after cooling one space.

The control system can use current and future (scheduled or predicted) occupancy as an input to the model predictive control algorithm, e.g., allowing for higher fan speeds that cause more noise when a space is unoccupied.

The control system can use the predictive models to detect discrepancies between predicted and measured data (e.g., using data collected from window and/or door sensors), and detect malfunctions or other undesirable conditions such as open windows or doors, or failing/malfunctioning system components. These models may be created by the control system for the specific home, or using data from several homes via a cloud management system.

The control system can allow users to specify temperature, humidity, and occupancy schedules that offer a large degree of freedom for the control system to exploit, e.g., to maximize energy efficiency. The control system can use predictive models to simulate the required energy use given selected user settings, and estimate the energy consumption impact of changes in user settings. For example, the control system can use patterns detected in presence data collected from presence sensors, e.g., a millimeter-Wave sensor installed in an IDU, to suggest more efficient setpoint schedules, thereby reducing the energy used to condition spaces while unoccupied. As another example, the control system can suggest more efficient allowable 'away' temperature ranges, and provide the user the estimated energy consumption reduction, e.g., to motivate the user to make such adjustments.

These and other features relating to the heat pump systems, control systems for heat pumps, and methods of controlling heat pumps are described in further detail below.

Figure 5:
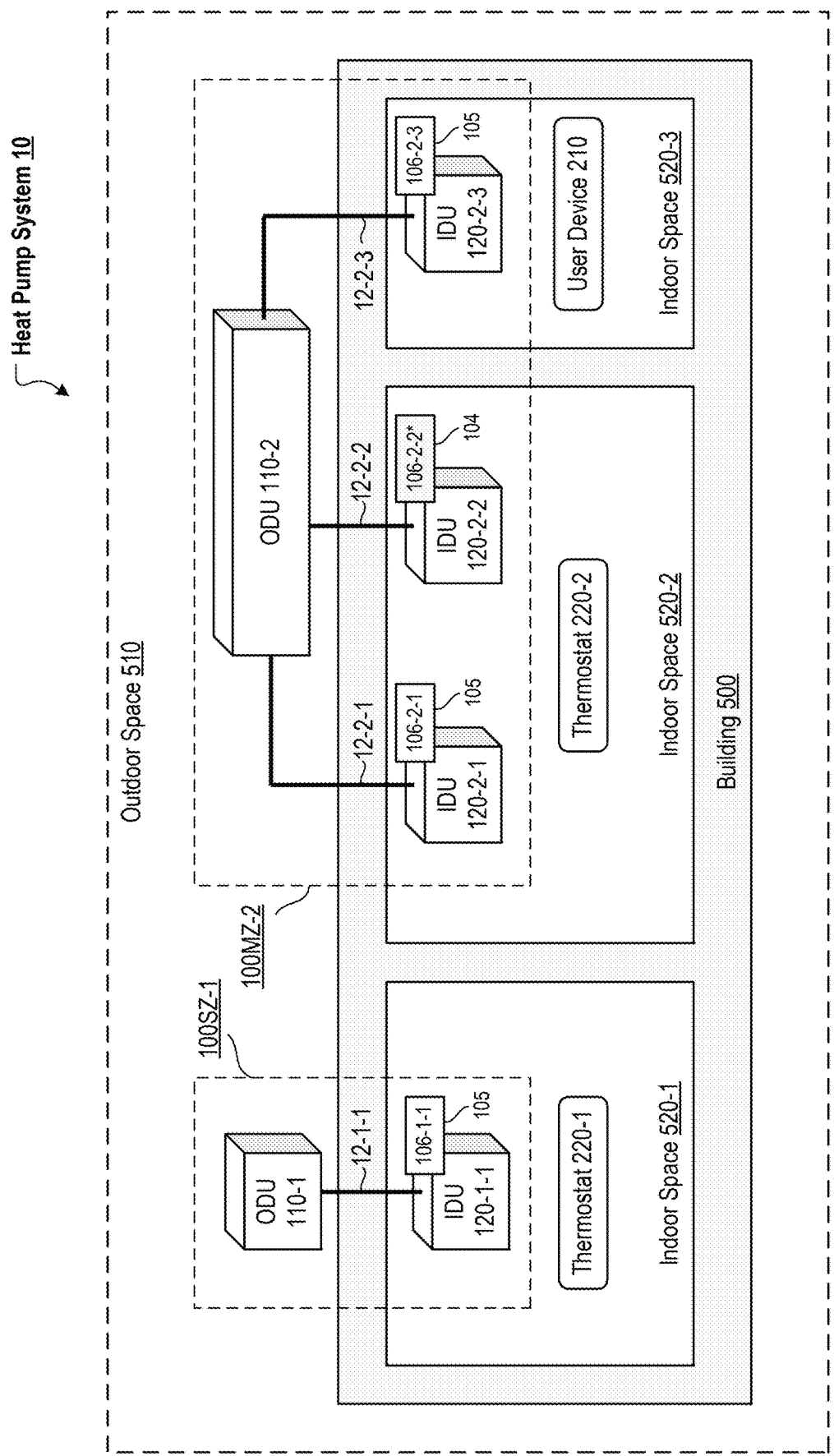
FIG. 5 is a schematic diagram depicting an example of a building configured with a heat pump system.

FIG. 1 is a schematic diagram depicting an example of a heat pump system 10. At a high-level, the heat pump system 10 includes: (i) a set of one or more heat pumps 100-1 through 100-N, and (ii) a control system 102 communicatively coupled with the set of heat pumps 100. As shown in FIG. 1, the control system 102 is communicatively coupled with each heat pump 100-1 through 100-N via respective bi-directional communication channels 14-1 through 14-N, e.g., wired communication channels (e.g., electrical cable or fiber-optic communication channels) or wireless communication channels (e.g., Wi-Fi, Bluetooth, 5G, infrared, or microwave communication channels). For reference, FIG. 5 is a schematic diagram depicting an example of a building 500, e.g., a home, office building, or other dwelling, configured with an example configuration of the heat pump system 10.

Figure 7A:
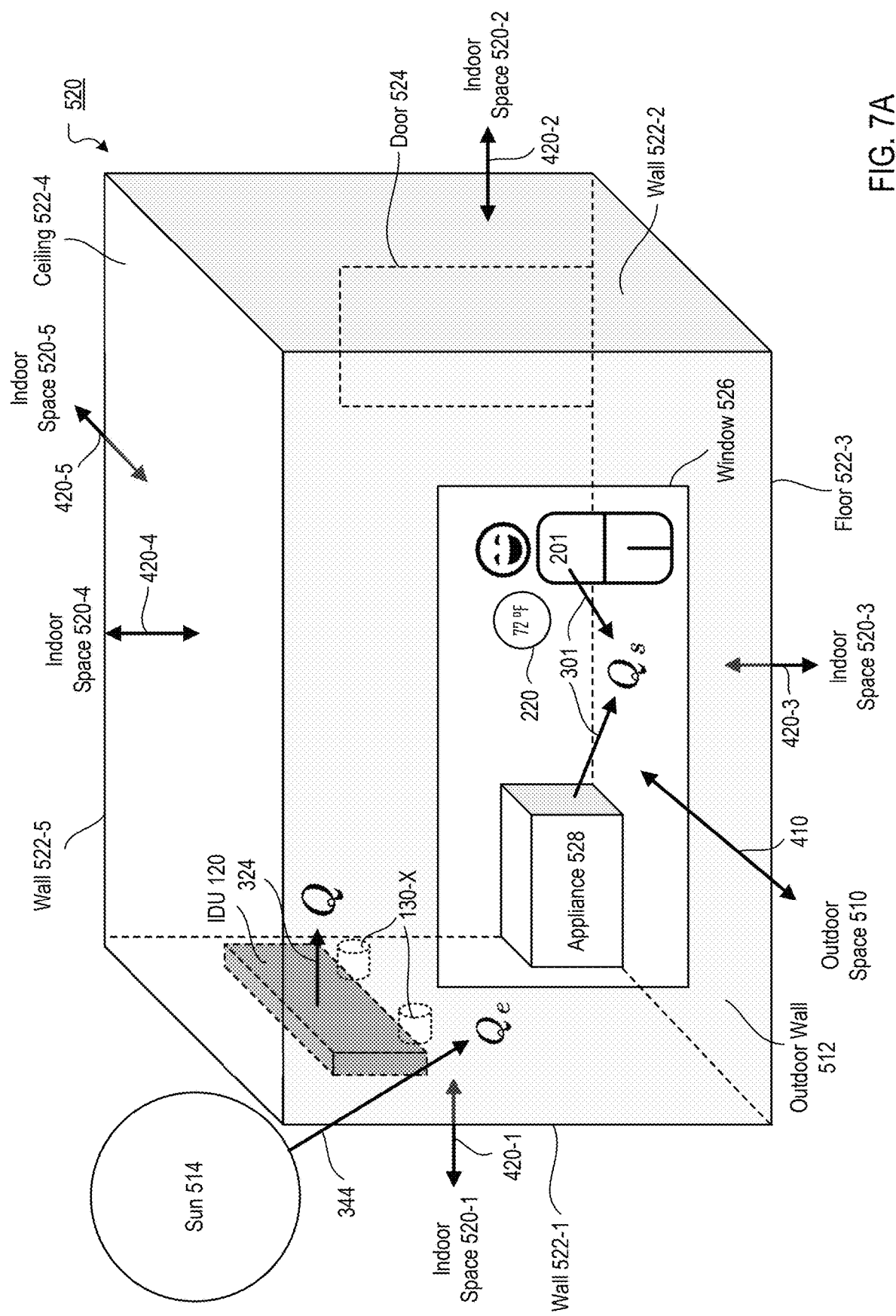
FIG. 7A is a schematic diagram depicting an example of an indoor space configured with an IDU of a heat pump for heating or cooling the indoor space.
Figure 7B:
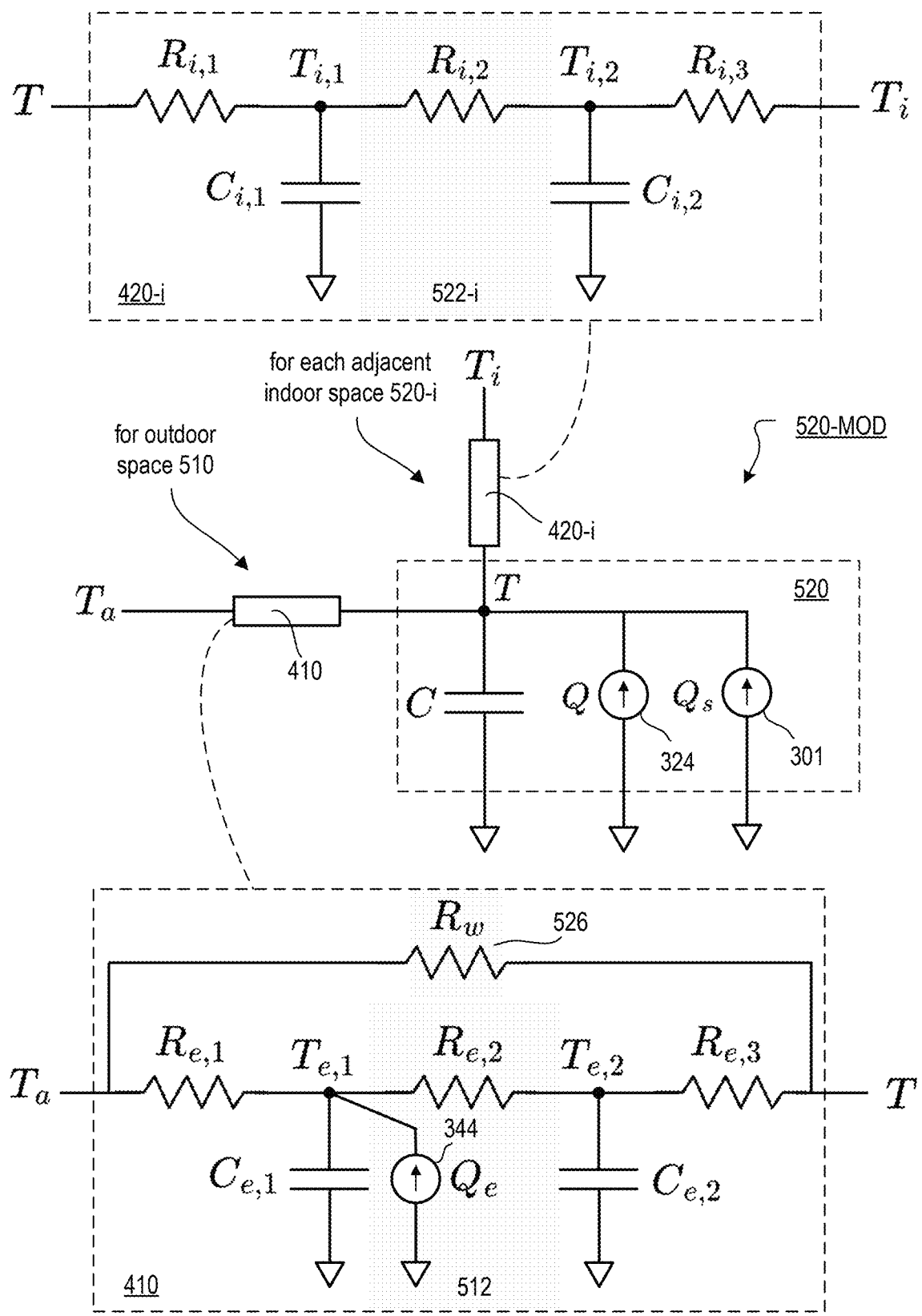
FIG. 7B depicts an example thermal model of the indoor space of FIG. 7A.

The set of heat pumps 100 is configured to transfer thermal energy between: (i) an outdoor space 510, and (ii) each of one or more indoor spaces 520-1 to 520-D, in accordance with a control sequence u(.) computed by the control system 102. That is, the set of heat pumps 100 can heat or cool each indoor space 520 according to the control sequence. For example, the set of heat pumps 100 can perform work in accordance with the control sequence to transfer thermal energy from the (cooler) outdoor space 520 to one or more of the (relatively warmer) indoor space(s) 520 for heating the one or more warmer indoor spaces. Alternatively, or in addition, the set of heat pumps 100 can perform work in accordance with the control sequence to transfer thermal energy from one or more of the (cooler) indoor space(s) 520 to the (relatively warmer) outdoor space 510 for cooling the one or more cooler indoor spaces. Hence, in some implementations, the set of heat pumps 100 is configured to simultaneously heat or cool each indoor space 520 individually, e.g., operating in a heating mode for a first subset of the indoor space(s) 520, while operating in a cooling mode for a second, different subset of the indoor space(s) 520. For reference, FIG. 7A is a schematic diagram depicting an example of an indoor space 520 thermally coupled to: (i) an outdoor space 510, and (ii) multiple, other indoor spaces 520-1 through 520-5, that are each adjacent to the indoor space 520. FIG. 7B depicts an example thermal model 520-MOD of the indoor space 520.

As used herein, a control sequence $u(.)=\{u_0, u_1, u_2, \ldots\}$ includes a respective control input ($u_n$) for the set of heat pumps 100 at each of multiple time steps $t_y$, where $n=0,1,2,\ldots$ indexes each time step in the control sequence. A control input $u_n=\{u_{n,j}\}=1^N$ for the set of heat pumps 100 can be further discretized into a respective control input ($u_{n,j}$) for each heat pump 100 in the set. Here, j indexes a heat pump 100 and N is the total number of heat pumps 100 in the heat pump system 10. In general, a control input for a heat pump 100 includes a respective control value (or control setting) for each of one or more components of the heat pump 100, where the control value(s) manipulate the behavior of the heat pump 100, e.g., the rate at which the heat pump 100 transfers thermal energy between the outdoor space 510 and one or more of the indoor space(s) 520. Examples of different components of a heat pump 100 that can be controlled by a control input are described in more detail with reference to FIGS. 3A-4B.

The control system 102 can execute a model predictive control algorithm to compute an optimal control sequence $u^*(.)=\{u_0^*, u_1^*, u_2^*, \ldots\}$ for the set heat pumps 100. The optimal control sequence includes a respective optimal control input ($u_n^*$) for the set of heat pumps 100 at each of the time steps. In general, the control system 102 executes the model predictive control algorithm to predict and optimize the future behavior of the heat pump system 10 based on the current behavior of the heat pump system 10. In many cases, the control system 102 also executes the model predictive control algorithm based on a scheduled and/or predicted, future behavior of the heat pump system 10, e.g., a weather forecast of the outdoor space 510, one or more setpoint schedules of the indoor space(s) 520, a reference control sequence for the set of heat pumps 100, a peak pricing schedule for the heat pump system 10, among other factors and/or constraints. For example, the control system 102 can compute an optimal control sequence that minimizes the energy usage or cost of the set of heat pumps 100, e.g., measured in kilowatt-hours (kWh) or United States dollars (USD) over the control sequence, while simultaneously accounting for the thermal couplings between the spaces 510 and 520, e.g., such that the heating or cooling of one indoor space 520 is utilized for (rather than competing with) the heating or cooling of another indoor space 520.

Figure 6A:
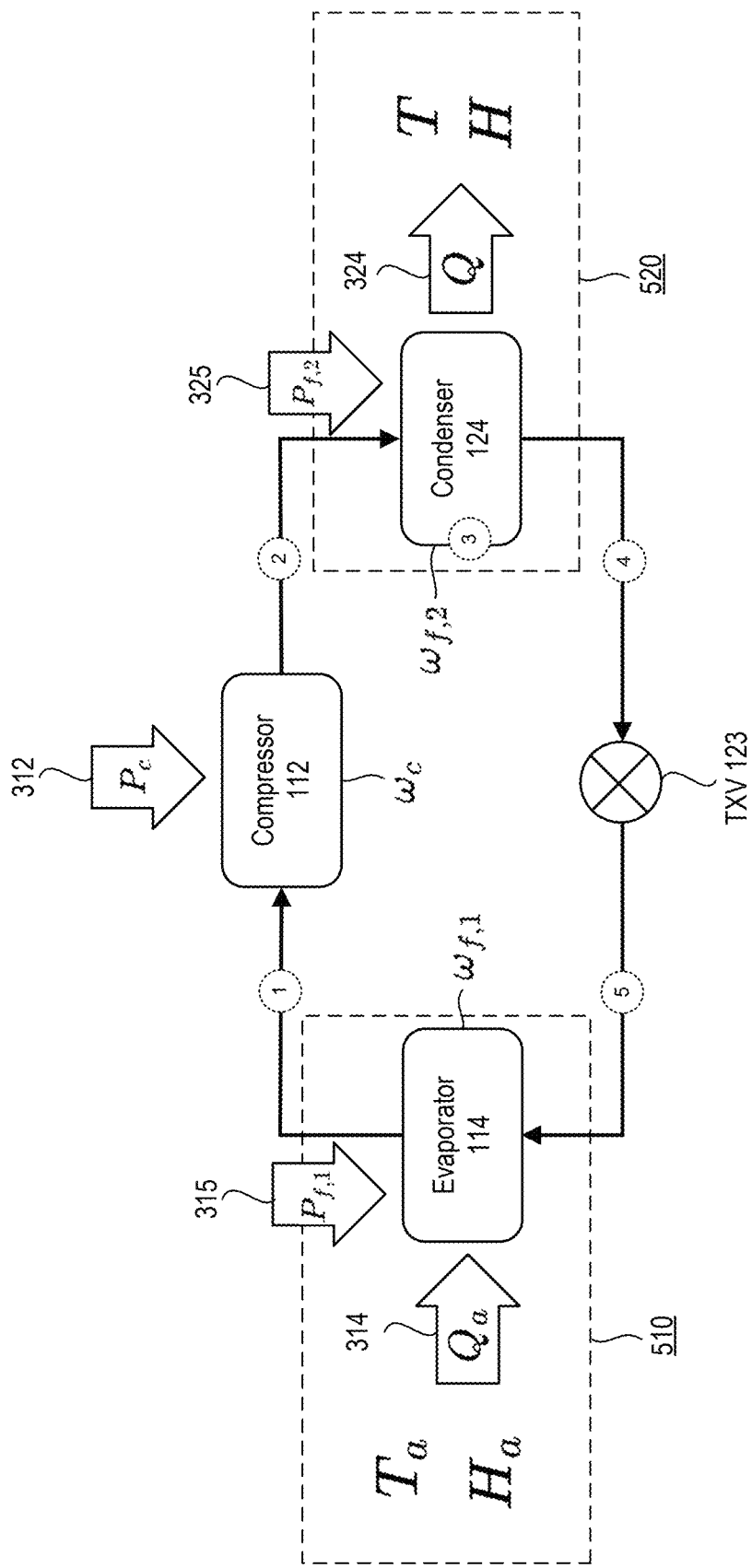
FIG. 6A is a schematic diagram depicting an example model of a single-zone heat pump in a heating mode.
Figure 6B:
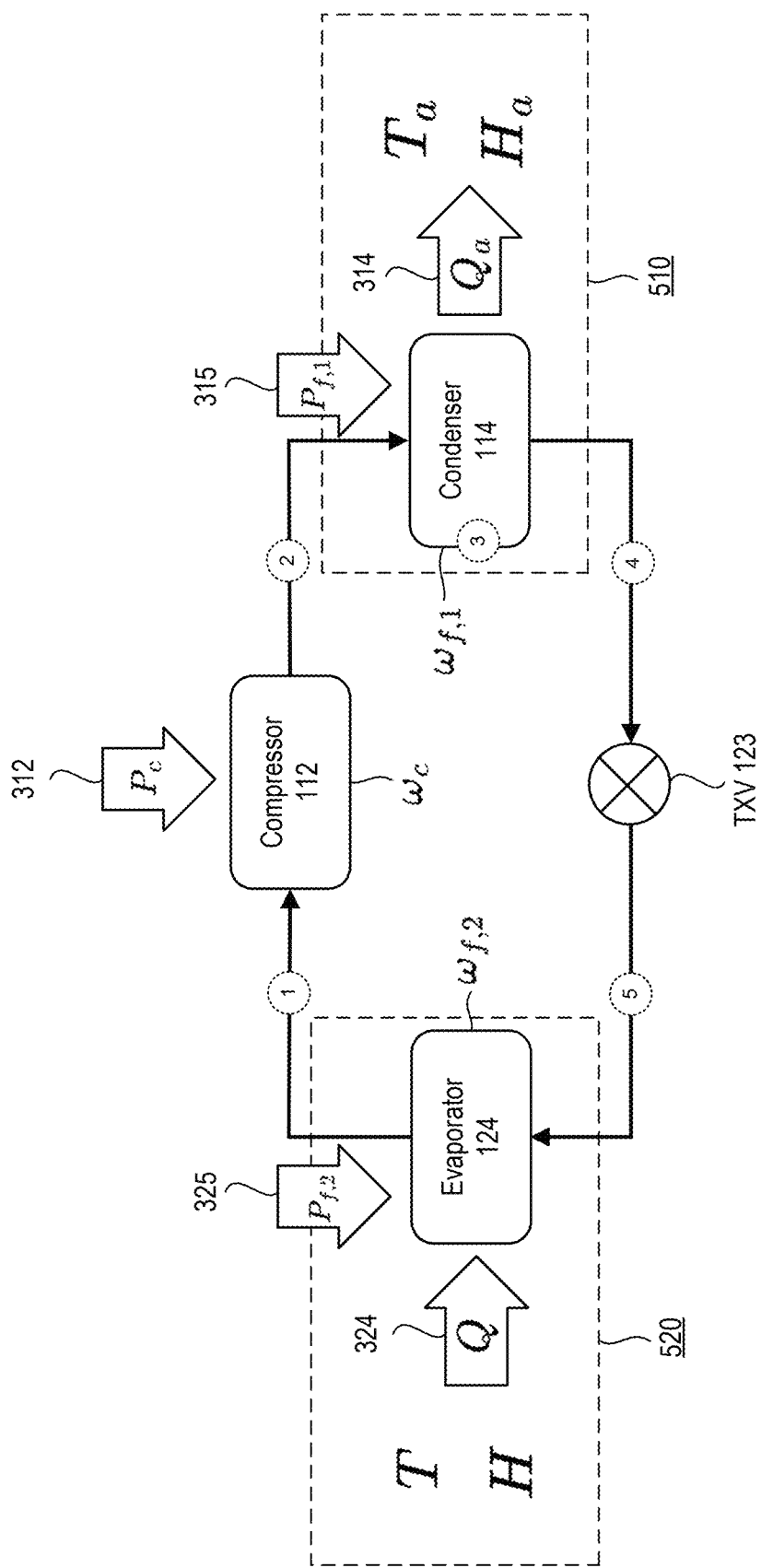
FIG. 6B is a schematic diagram depicting an example model of a single-zone heat pump in a cooling mode.
Figure 6C:
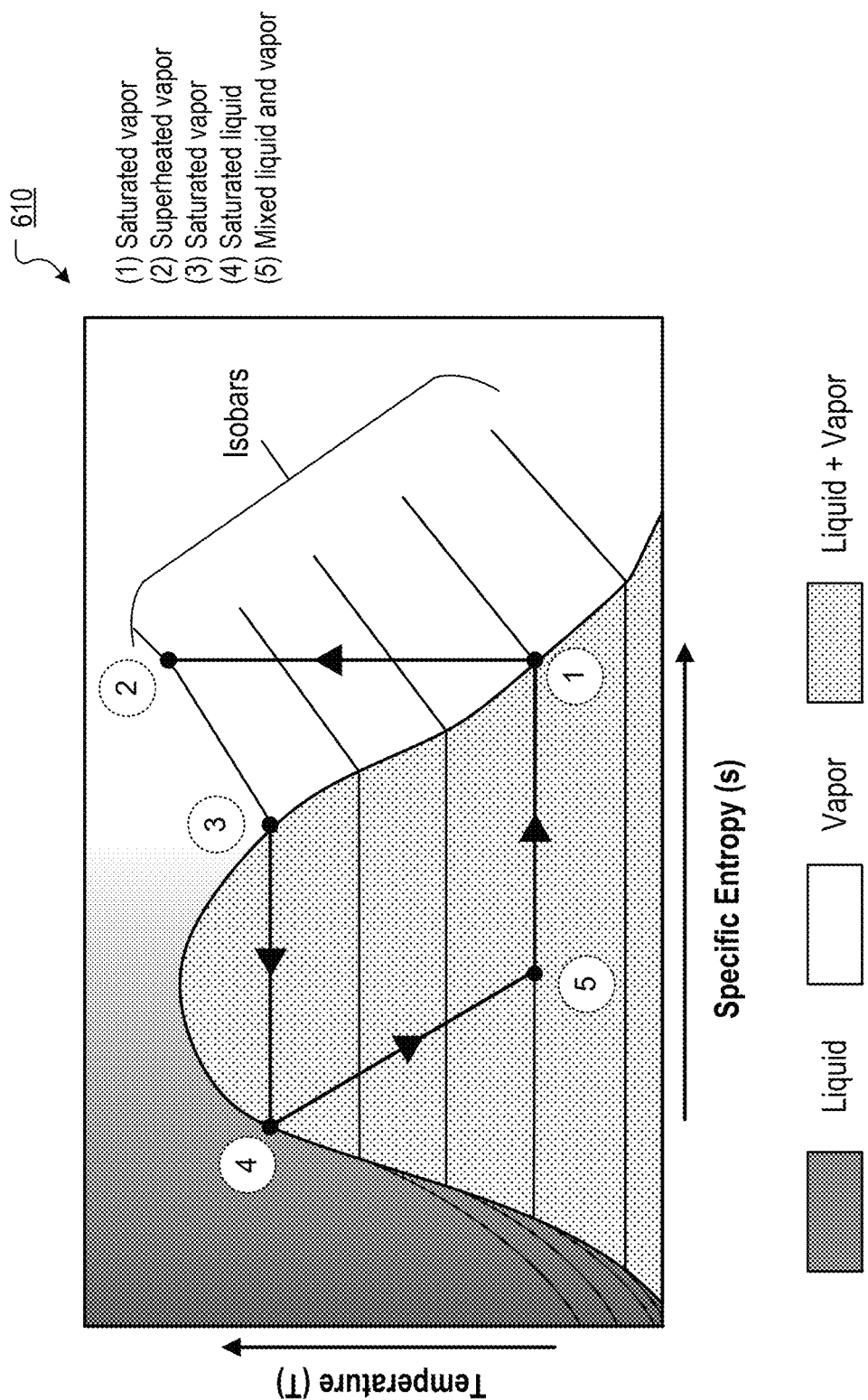
FIG. 6C is a phase diagram depicting an example of a vapor-compression cycle that can be implemented by a heat pump.

As shown in FIG. 1, a heat pump 100 includes: (i) an outdoor unit (ODU) 110 (e.g., FIG. 3A), and (ii) one or more indoor units (IDUs) 120-1 through 120-M (e.g., FIG. 3B). If the heat pump 100 includes a single IDU 120, it is referred to as a "single-zone heat pump" 100SZ (e.g., FIG. 4A). If the heat pump 100 includes multiple IDUs 120, it is referred to as a "multi-zone heat pump" 100MZ (e.g., FIG. 4B). The ODU 110 is thermally coupled to each of the IDU(s) 120-1 through 120-M via sets of fluid lines 12-1 through 12-M, e.g., refrigerant or gas lines, connected therebetween. The heat pump 100 is configured to transfer thermal energy from its ODU 110 to each of its IDU(s) 120, or vice versa, by circulating a working fluid (e.g., a refrigerant or gas) in a thermodynamic cycle (e.g., a vapor-compression or gas cycle), e.g., to implement a heating or cooling mode. Examples of refrigerants for a vapor-compression cycle include, but are not limited to, R-410A, R-22, R-134a, R-32, R-1234yf, among others. Examples of gases (e.g., refrigerant gases) for a (single-phase) gas cycle (e.g., a reverse Brayton cycle) include, but are not limited to, air, R-170, R-290, R-600, R-600a, R-22, among others. For reference, FIGS. 6A and 6B are schematic diagrams depicting an example model of a single-zone heat pump 100SZ in a heating 600A and cooling 600B mode, respectively, when implementing a vapor-compression cycle. FIG. 6C is a phase diagram 610 depicting an example of the vapor-compression cycle. The ODU 110 can be positioned in the outdoor space 510 and is configured to transfer thermal energy between the working fluid and the outdoor space 510. Each IDU 120 can be positioned in one of the indoor space(s) 520 and is configured to transfer thermal energy between the working fluid and the indoor space 520. The sets of fluid lines 12-1 through 12-M circulate the working fluid between the ODU 110 and each of the IDU(s) 120-1 through 120-M to implement the thermodynamic cycle.

Note, multiple IDUs 120 can be positioned in the same indoor space 520, e.g., in multiple different zones of the indoor space 520, depending on the thermal output of the IDUs 120 and/or the thermal requirements of the indoor space 520. For instance, as shown in the example configuration of the heat pump system 10 in FIG. 5, a first (single-zone) heat pump 100SZ-1 includes an ODU 110-1 positioned in the outdoor space 510 and an IDU 120-1-1 positioned in a first indoor space 520-1. A second (multi-zone) heat pump 100-2 includes an ODU 110-2 positioned in the outdoor space 510, two IDUs 120-2-1 and 120-2-2 positioned in a second indoor space 520-2 adjacent the first indoor space 520-1, and an IDU 120-2-3 positioned in a third indoor space 520-3 adjacent the second indoor space 520-2. The ODUs 110-1 and 110-2 of the heat pumps 100SZ-1 and 100MZ-2 are both positioned in an outdoor space 510 that is adjacent to each of the indoors spaces 520-1, 520-2, and 520-3 and surrounds the indoor spaces 520-1, 520-2, and 520-3. Hence, in general, the indoors spaces 520-1, 520-2, and 520-3 are thermally coupled to one another and each is thermally coupled to the outdoor space 510. The control system 102 can account for such thermally couplings, as well as different configurations and performance metrics of the ODUs 110 and IDUs 120, when computing the optimal control sequence for the set of heat pumps 100.

In light of this, many different configurations of the heat pump system 10 are feasible with IDUs 120 of the heat pumps 100 arranged in different combinations within the indoor space(s) 520. In general, an indoor space 520 can have one or more IDUs 120 of the heat pumps 100 positioned therein, where the one or more IDUs 120 belong to one or more single-zone heat pumps 100SZ, one or more multi-zone heat pumps 100MZ, or one or more single-zone heat pumps 100SZ and one or more multi-zone heat pumps 100MZ. As one example, an indoor space 520 can have one IDU 120 positioned therein, where the IDU 120 belongs to a single-zone heat pump 100SZ or a multi-zone heat pump 100MZ. As another example, an indoor space 520 can have two IDUs 120 positioned therein, where one of the two IDUs 120 belongs to a single-zone heat pump 100SZ and the other of the two IDUs 120 belongs to a multi-zone heat pump 100MZ or another, different single-zone heat pump 100SZ. In other cases, one of the two IDUs 120 belongs to a multi-zone heat pump 100MZ and the other of the two IDUs 120 belongs to another, different multi-zone heat pump 100MZ. In yet other cases, both of the two IDUs 120 belong to the same multi-zone heat pump 100MZ. This extends to three or more IDUs 120, four or more IDUs 120, five or more IDUs 120, and so on, positioned in an indoor space 520.

Hence, in implementations involving one single-zone heat pump 100SZ, the heat pump system 10 can be operated as a single-zone heat pump system, e.g., a single-zone variable-speed ductless heat pump system, to efficiently condition a single indoor space 520, e.g., a room, office, studio, or Accessory Dwelling Unit (ADU). In implementations involving multiple single-zone heat pumps 100SZ, one or more multi-zone heat pumps 100MZ, or one or more single-zone heat pumps 100SZ and one or more multi-zone heat pumps 100MZ, the heat pump system 10 can be operated as a multi-zone heat pump system, e.g., a multi-zone variable-speed ductless heat pump system, to efficiently condition multiple indoor spaces 520 and/or multiple zones of one or more indoor spaces 520, e.g., covering part or the whole of a home, residence, or other dwelling. The heat pump system 10 can seamlessly combine more than one IDU 120 per indoor space 520 by balancing the thermal output of each IDU 120, while a user can set the desired temperature, desired humidity, and/or expected occupancy for the indoor space 520.

To facilitate input from one or more users, the heat pump system 10 further includes user controls 200 that are communicatively coupled with the control system 102 via bi-directional communication channels 22, e.g., wired and/or wireless communication channels. In this example, the user controls 200 include a user device 210, e.g., a mobile user device such as a smart phone, smartwatch (or other wearable user device), tablet, or laptop that allows the heat pump system 10 to be remotely controlled, e.g., via a remote-control application over a wireless communication channel. Note, while one user device 210 is depicted in FIG. 1, the user controls 200 may include multiple such user devices 210 for one or more users of the heat pump system 10. The user controls 200 also include one or more (e.g., smart) thermostats 220-1 through 220-P that each include a (e.g., graphical) user interface for inputting user commands. Particularly, a user can provide a user input to the control system 102, via the user controls 200, that modifies the optimal control sequence computed by the control system 102. The user controls 200 allow users to provide general or individual preferences for temperature and humidity schedules, setup an occupancy schedule, and/or directly control the set of heat pumps 100. The user controls 200 may also allow users to specify how the heat pump system 10 should tradeoff between comfort, noise, energy usage, energy cost, and/or climate impact (e.g., estimated equivalent carbon dioxide ($CO_2$) output). Examples of such user inputs are provided below.

As one example, a user input can specify a temperature schedule $T'(.)=\{T_0', T_1', T_2' \ldots\}$ including a respective set of setpoint temperatures $T_n'=\{T_{n,i}'\}_{i=1}^{D}$ for the indoor space(s) 520 for each time step in the control sequence. Here, i indexes an indoor space 520 and D is the total number of indoor spaces 520 conditioned by the heat pump system 10. Note, the temperature of a space generally refers to the degree of hotness or coldness of the space. Temperature can be measured in terms of any appropriate temperature scale such as the Celsius scale (C), the Kelvin scale (K), or the Fahrenheit scale (F).

As another example, a user input can specify a humidity schedule $H'(.)=\{H_0', H_1', H_2' \ldots\}$ including a respective set of setpoint humidities $H_n'=\{H_{n,i}'\}_{i=1}^{D}$ for the indoor space(s) 520 for each time step in the control sequence. Note, the humidity of a space generally refers to the concentration of water vapor present in the air residing in the space. Humidity can be measured in terms of absolute humidity (AH, i.e., the total mass of water vapor present in a volume or mass of air), relative humidity (RH, i.e., the ratio of the partial pressure of water vapor in air to the saturation vapor pressure of water at the same temperature), or specific humidity (SH, i.e., the ratio of the mass of water vapor to the total mass of the air parcel). Specific humidity (or moisture content) is often referred to as the "humidity ratio" and is approximately equal to the mixing ratio, defined as the ratio of the mass of water vapor in an air parcel to the mass of dry air for the same parcel.

As yet another example, a user input can specify an occupancy schedule $O'(.)=\{O_0', O_1', O_2' \ldots\}$ including a respective set of expected occupancies $O_n'=\{O_{n,i}'\}_{i=1}^{D}$ for the indoor space(s) 520 for each time step in the control sequence. Note, the occupancy of a space may be measured in multiple ways depending on the context. In one implementation, the occupancy of a space is defined by a probability that the space is occupied by at least one occupant. Here, the occupancy can be a value in a range from zero to one, with zero corresponding to unoccupied (e.g., "false") and one corresponding to occupied (e.g., "true"). In another implementation, the occupancy of a space is defined by a natural number including zero, with zero corresponding to unoccupied and a positive integer corresponding to the number of occupants in the space. A combination of these approaches may also be used. For example, in yet another implementation, the occupancy of a space is defined by a respective probability that the space is occupied by each of one or more occupants. In yet another implementation, the occupancy of a space is defined by a joint probability distribution over each of one or more occupants of the space.

As yet another example, a user input can specify a reference control sequence $u'(.)=\{u_0', u_1', u_2' \ldots\}$ including a respective reference control input ($u_n'$) for the set of heat pumps 100 for each time step in the control sequence. These situations can be suitable when a user wishes to directly control one or more of the heat pumps 100 via the user controls 200, e.g., remote-controlling one or more components of one or more of the heat pumps 100 via the user device 210, e.g., a compressor 112, outdoor heat exchanger 114, or indoor heat exchanger(s) 124 of one or more of the heat pumps 100.

In some implementations, a user input can specify one or more constraints on the heat pump system 10, e.g., to indicate to the control system 102 how to tradeoff between comfort, noise, energy usage, energy cost, and/or environmental impact. For example, to set a "comfort band" for the indoor space(s) 520, a user input may specify a respective minimum ($T_{min,i}$) and maximum ($T_{max,i}$) bound on the temperature of each indoor space 520, and/or a respective minimum ($H_{min,i}$) and maximum ($H_{max,i}$) bound on the humidity of each indoor space 520. The user input may also specify a respective maximum change in the temperature ($\Delta T_i$) and/or humidity ($\Delta H_i$) of each indoor space 520 at a time step to control for fluctuations in these parameters. As another example, to set a "noise band" for the set of heat pumps 100, a user input may specify a respective minimum ($u_{min,j}$) and maximum ($u_{max,j}$) bound on the control input for each heat pump 100. The user input may also specify a respective maximum change in the control input ($\Delta u$) of each heat pump 100 at a time step to control for fluctuations in these parameters. As yet another example, to set an energy usage and/or an energy cost level for the set of heat pumps 100, a user input may specify a respective maximum bound ($P_{max,j}$) on the net power consumption of each heat pump 100, a maximum bound ($C_{max}$) on the total energy cost rate of the set of heat pumps 100, and/or a maximum bound on the total equivalent carbon dioxide ($CO_2$) output rate of the set of heat pumps 100.

The independent control of each heat pump 100 in the heat pump system 10 allows a user to turn the heat pump system 10 down or off for indoor spaces 520 that are not used for a period of time, either by setting up one or more schedules for each indoor space 520, manually adjusting the heat pump system 10 using a thermostat 220 when entering or leaving the indoor space 520, or remotely via a user device 210, e.g., using a smartphone app. As described in more detail below, the control system 102 can implement some, or all, of these abovementioned schedules and constraints when executing the model predictive control algorithm to compute the optimal control sequence for the set of heat pumps 100. Note, in some implementations, the control system 102 may be initialized with default values for the constraints which can then be modified by a user input, e.g., if the user input does not specify constraints that exceed the hardware limitations of the heat pump system 10.

A thermostat 220 can be positioned in one of the indoor space(s) 520 and includes one or more sensors 130 for collecting status information of the indoor space 520, e.g., measuring a current state ($\hat{x}_{n,i}$) of the indoor space 520. As used herein, a state $x_{n,i}=(T_{n,i}, H_{n,i}, O_{n,i})$ of an indoor space 520 at a time step can include a temperature ($T_{n,i}$), a humidity ($H_{n,i}$), and an occupancy ($O_{n,i}$) of the indoor space 520 at the time step.

Particularly, the thermostat 220 includes a temperature sensor 130T for measuring a current temperature ($\hat{T}_{n,i}$) of the indoor space 520. For instance, as shown in the example configuration of the heat pump system 10 in FIG. 5, a first thermostat 220-1 is positioned in the first indoor space 520-1 for measuring the current temperature of the first indoor space 520-1, a second thermostat 220-2 is positioned in the second indoor space 520-2 for measuring the current temperature of the second indoor space 520-2, and the user device 210 is positioned in the third indoor space 530-3, e.g., carried by a user occupying the third indoor space 520-3. Examples of temperature sensors 130T include, but are not limited to, thermocouples, thermistors, resistance temperature detectors (RTDs), semiconductor-based integrated circuits, infrared temperature sensors, among others. The thermostat 220 may also include one or more additional sensors 130 for collecting other status information of the indoor space 520. For example, the thermostat 220 can include a humidity sensor 130H for measuring a current humidity ($\hat{H}_{n,i}$) of the indoor space 520. Examples of humidity sensors 130H include, but are not limited to, capacitive humidity sensors, resistive humidity sensors, thermal conductivity humidity sensors, among others. As another example, the thermostat 220 can include a presence sensor 130M for measuring a current occupancy ($\hat{O}_{n,i}$) of the indoor space 520. Examples of presence sensors 130M include, but are not limited to, millimeter-wave (mmWave) sensors, thermal imaging sensors, passive infrared (PIR) sensors, light detection and ranging (LIDAR) sensors, carbon dioxide ($CO_2$) sensors, window and/or door sensors (e.g., opened/closed or opening angle), connected Internet of things (IoT) sensors, among others.

In some implementations, the user device 210 may also include one or more sensors 130, e.g., heart rate monitors, temperature sensors, accelerometers, a Global Positioning System (GPS), and/or radio detection and ranging (RADAR) sensors, for collecting status information of a user of the user device 210, e.g., biometric data including heart rate, skin temperature, oxygenation, sleep cycle, motion, and/or (geo) location of the user. Such biometric data may be utilized by the control system 102 in conjunction with status information collected by presence sensors 130M to determine the current and/or predicted, future occupancy of each indoor space 520, e.g., based on whether the user is vacant, asleep, or in motion.

In some implementations (e.g., FIGS. 3A-3B), a heat pump 100 may also include one or more sensors 130 for collecting status information of the outdoor space 510, one or more indoor spaces 520, and/or the heat pump 100 itself, e.g., measuring a current state ($\hat{x}_{n,a}$) of the outdoor space 510, the current states ($\hat{x}_{n,i}$) of the indoor space(s) 520, and/or a current state ($\hat{x}_{n,j}$) of the heat pump 100.

As used herein, a state $x_{n,a}=(T_{n,a}, H_{n,a})$ of the outdoor space 510 at a time step can include an ambient temperature ($T_{n,a}$) and humidity ($H_{n,a}$) of the outdoor space 510 at the time step. In some implementations, the state of the outdoor space 510 may also include other information about the outdoor space 510, such as an overcast of the outdoor space 510 (e.g., cloud cover of the Sun 514), a wind speed (and direction) relative to a building 500 positioned in the outdoor space 510, and/or coordinates (or an angle) of the Sun 514 relative to the building 500 positioned in the outdoor space 510. For example, the control system 102 can use the (geo) location of the building 500 and the equations from the Astronomical Almanac to calculate the apparent (e.g., ecliptic) coordinates of the Sun 514, as well as the mean equinox and ecliptic of date.

As used herein, a state ($x_{n,j}$) of a heat pump 100 at a time step can include a respective temperature, pressure, and flow rate of the working fluid at each of one or more thermodynamic points in the thermodynamic cycle implemented by the heat pump 100, at the time step. In some implementations, the state of the heat pump 100 may also include other information about the heat pump 100, such as a charge (or mass) of the working fluid circulating through the heat pump 100, a respective temperature, humidity, and flow rate of input (intake) air and/or output (exhaust) air of each ODU 110 and IDU 120 of the heat pump 100, and/or a power, current, and/or voltage consumed by the heat pump 100.

In some implementations, the heat pump system 10 can also be connected to a cloud management system (or cloud server) 60. Here, the control system 102 can access the cloud server 60 via a secure network connection 61 over the Internet. The cloud server 60 can provide access to current and historical data collected from control systems 102-X of other heat pump systems that are also connected to the cloud server 60, e.g., heat pump systems of other homes, office buildings, or dwellings. The cloud server 60 may also be configured to control some or all of the connected heat pump systems. For example, the cloud server 60 may be implemented as a centralized control system that manages multiple heat pump systems owned by an enterprise, e.g., with a respective heat pump system configured for each office building that the enterprise owns. Engineering and laboratory data about the ODUs 110 and IDUs 120 can be made available to the control system 102 via the cloud server 60. Such data can be utilized by the control system 102 for performing temperature feedback control, model predictive control, and/or model estimation and refinement. This data can include component specifications such as compressor performance curves, and tables, charts, or curves that yield energy consumption and thermal output as a function of various parameters for the specific combination of ODUs 110 and IDUs 120 utilized by the heat pump system 10. The cloud server 60 may also provide direct or cloud-to-cloud integration with external data providers 64, e.g., third-party applications and hardware such as smartphones, wearable devices, and IoT devices.

The user controls 200 and/or the cloud server 60 may also provide the control system 102 with access to predictive data characterizing predicted, future constraints placed on the heat pump system 10 from external factors, e.g., weather conditions and/or an energy provider. As one example, the control system 102 can receive, e.g., from a weather app installed on the user controls 200, a (local) weather forecast $x_a'(.)=\{x_{0,a}', x_{1,a}', x_{2,a}' \ldots\}$ including a respective predicted state $(x_{n,a}')$ of the outdoor space 510 for each time step in the control sequence. As another example, the control system 102 can also receive, e.g., from an energy provider via the cloud server 60, a peak pricing schedule $\psi(.)=\{\psi_0, \psi_1, \psi_2 \ldots\}$ including a respective predicted price of energy $(\psi_n)$ for each time step in the control sequence. The price of energy can be measured in USD/kWh, or some other (e.g., local) currency.

As shown in FIG. 1, the control system 102 includes processing circuitry 50 and associated memory 52 for processing and logging control and status information generated by the heat pump system 10, handling bi-directional communications for the heat pump system 10, and executing the model predictive control algorithm to compute the optimal control sequence for the set of heat pumps 100. Details of the model predictive control algorithm and other processes performed by the control system 102 are described with reference to FIGS. 8A-8B. An overview of the control system 102 is described below.

Note, various implementations of the control system 102 are feasible depending on the configuration and requirements of the heat pump system 10, e.g., the number of ODUs 110 and/or IDUs 120, the quality of the communication channels 14 and 22, the accessibility of the control system 102 for maintenance, among other factors. For example, in some implementations, the control system 102 is a single control device 106, e.g., housed in one of the ODUs 110, one of the IDUs 120, or a separate module. These implementations may be preferred when the heat pump system 10 is a single-zone heat pump system, e.g., to reduce complexity and facilitate easier maintenance of the control system 102. In other implementations, the control system 102 is a distributed control system including multiple control devices 106, e.g., housed in the ODUs 110, IDUs 120, and/or in one or more separate modules. Here, the control devices 106 may be identical to one another, e.g., having the same computing architecture. These implementations may be preferred when the heat pump system 10 is a multi-zone heat pump system, e.g., to handle malfunction or shutdown of a part of the heat pump system 10 while still providing control and use of the functional part of the heat pump system 10. Examples of such implementations of the control system 102 are described below with reference to FIGS. 2A-2B.

Figure 2A:
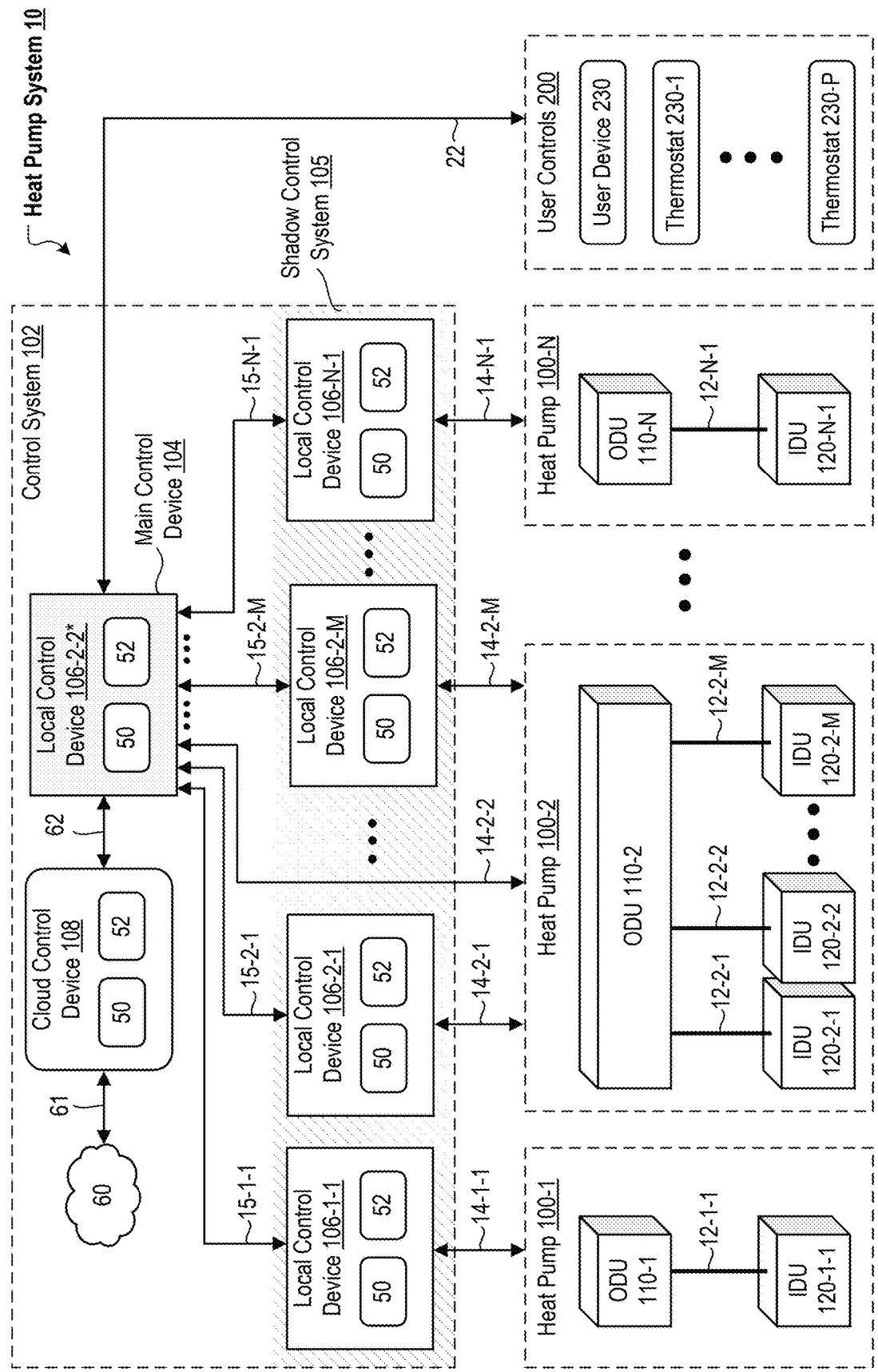
FIG. 2A is a schematic diagram depicting an example of a heat pump system including a set of heat pumps and a distributed control system.

FIG. 2A is a schematic diagram depicting an example configuration of the heat pump system 10, where the control system 102 is a distributed control system including multiple control devices 106-1-1 through 106-N-1. Particularly, the control system 102 includes a respective control device 106 for each IDU 120 in the heat pump system 10. For example, each control device 106 can be a local control device housed in its respective IDU 120. Thus, in this implementation, a single-zone heat pump 100SZ is communicatively coupled with a single local control device 106 and a multi-zone heat pump 100MZ is communicatively coupled with multiple local control devices 106. For instance, as shown in the example configuration of the heat pump system 10 in FIG. 5, IDU 120-1-1 houses local control device 106-1-1, IDU 120-2-1 houses local control device 106-2-1, IDU 120-2-2 houses local control device 106-2-2, and IDU-2-3 houses local control device 106-2-3.

As shown in FIG. 2A, the control devices 106 each include processing circuitry 50 and associated memory 52 for performing their assigned function and handling bi-directional communications with their part of the heat pump system 10. For example, each control device 106 can receive status information from the respective sensors 130 and transmit control information (e.g., control values) to the respective components of the heat pump 100 that the control device 106 is communicatively coupled with. The control devices 106-1-1 through 106-N-1 are also communicatively coupled with one another via respective bi-directional communication channels 15-1-1 through 15-N-1, e.g., wireless communication channels. Hence, the control devices 106 can also exchange control and status information with one another.

In more detail, the control system 102 is distributed amongst: (i) a first control device 106* that is currently configured as a main control device 104 (e.g., control device 106-2-2*), and (ii) the remaining control devices 106 (e.g., control devices 106-1-1 through 106-N-1 excluding 106-2-2*) which operate as a shadow control system 105 for the first control device 106*. Here, the control system 102 further includes a cloud control device 108 communicatively coupled with the main control device 104 via a bi-directional communication channel 62, e.g., a wireless communication channel. The cloud control device 108 connects the heat pump system 10 to the cloud server 60 and facilitates communications therebetween, e.g., allowing the main control device 104 to access and/or be remote-controlled by the cloud server 60.

The main control device 104 is responsible for communications with the user controls 200 and the cloud control device 108, executing the model predictive control algorithm to compute the optimal control sequence for the set of heat pumps 100, and logging the control and status information generated by the heat pump system 10.

On the other hand, the shadow control system 105 is responsible for monitoring health status information of the first control device 106* while the first control device 106* is executing the model predictive control algorithm. The shadow control system 105 is synchronized with the first control device 106* and acts as a failsafe in the event of malfunction or shutdown of the first control device 106*.

Particularly, the shadow control system 105 runs one or more shadow copies of the first control device 106*. Note, as used herein, a shadow copy of a control device 106 (or other computing device) refers to a current backup copy (or snapshot) of the control device 106's computer volume, files, and/or system configuration. Moreover, a shadow copy of a control device 106 can be generated while the control device 106 is in active use. "Shadow Copy" included in Microsoft Windows is one example of a technology that can implement this.

If the shadow control system 105 detects a fault or failure of the first control device 106*, the shadow control system 105 then elects a second control device 106 from the shadow control system 105 to be configured as the main control device 104. For example, the shadow control system 105 can implement a voting system, e.g., a ranked voting system satisfying a Condorcet criterion, to elect the second control device 106 as the main control device 104. The shadow control system 105 then initializes the second control device 106** with a shadow copy of the first control device 106*. The second control device 106** then continues executing the model predictive control algorithm to compute the optimal control sequence for the set of heat pumps 100 uninterrupted. This procedure allows the control system 102 to dynamically react to faults or failures at any part of the heat pump system 10 while still maintaining full (or almost full) operation of the functional parts of the system 10.

Note, in some implementations, each control device 106 in the shadow control system 105 runs a respective shadow copy of the first control device 106*, e.g., such that, upon election from the shadow control system 105, the second control device 106* can immediately load a shadow copy of the first control device 106* stored in its memory 52.

Figure 2B:
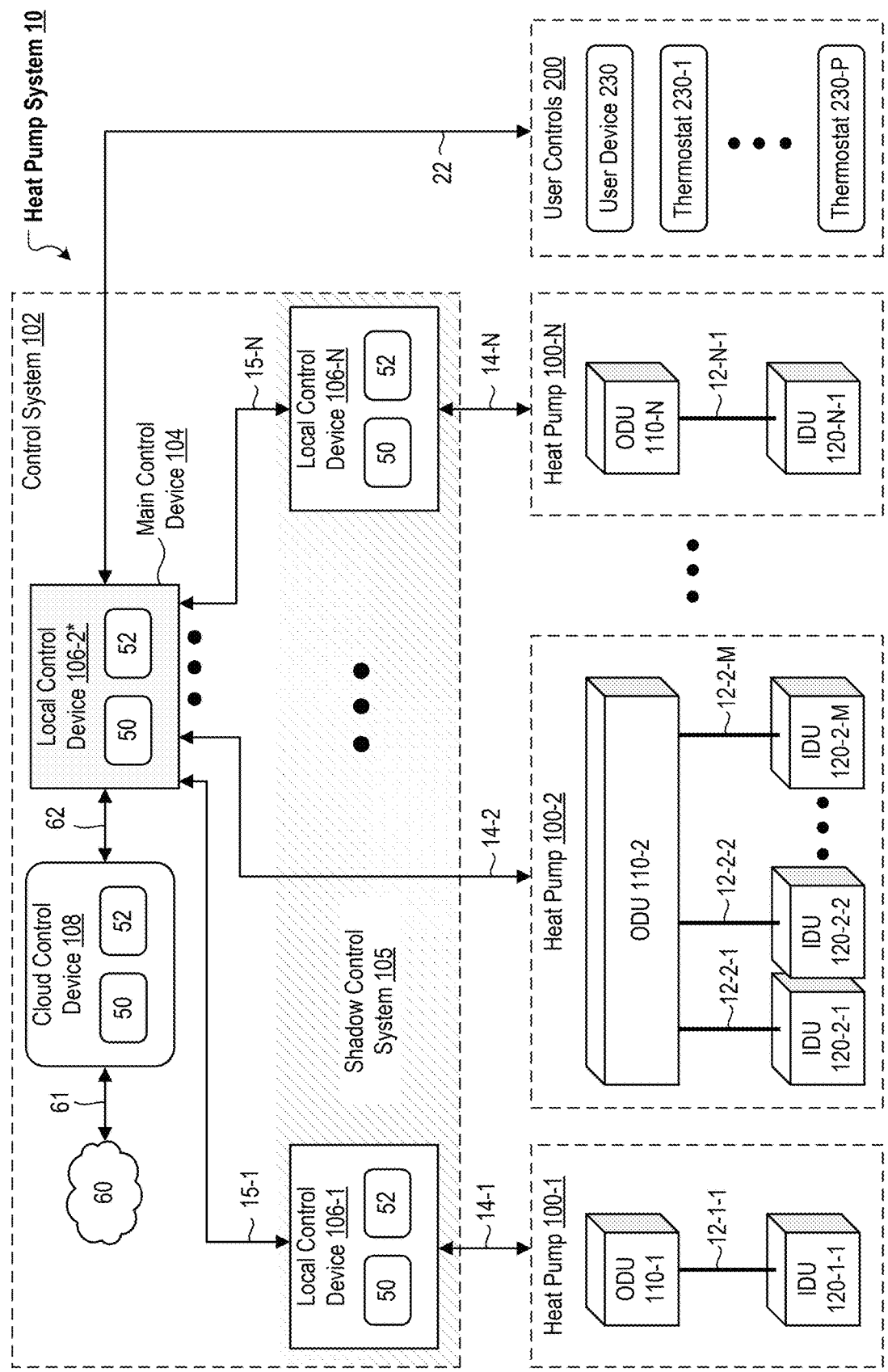
FIG. 2B is a schematic diagram depicting another example of a heat pump system including a set of heat pumps and a distributed control system.

FIG. 2B is a schematic diagram depicting another example configuration of the heat pump system 10, where the control system 102 is a distributed control system including multiple control devices 106-1 through 106-N. The control system 102 is configured similarly to the example configuration of the heat pump system 10 shown in FIG. 2A. However, in this implementation, the control system 102 includes a respective control device 106 for each heat pump 100 in the heat pump system 10. For example, each control device 106 can be a local control device housed in its respective heat pump 100, e.g., in the ODU 110 or an IDU 120 of the heat pump 100.

Figure 3A:
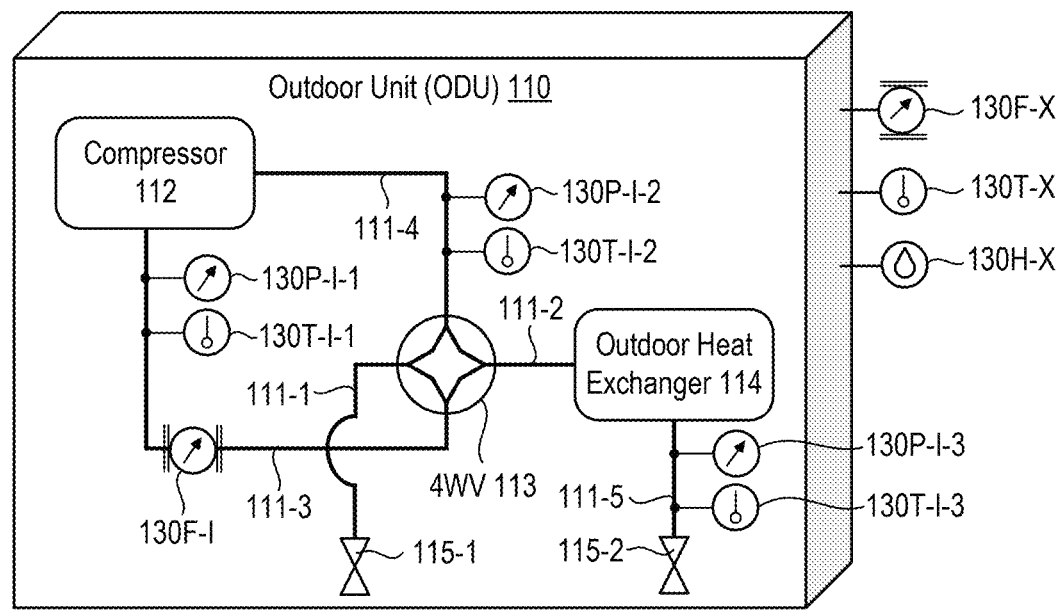
FIG. 3A is a schematic diagram depicting an example of an outdoor unit (ODU).

FIG. 3A is a schematic diagram depicting an example of an ODU 110. The ODU 110 is configured to transfer thermal energy to or from an outdoor space 510 in accordance with one or more control values, e.g., included in a control input for a heat pump 100 configured with the ODU 110.

The ODU 110 includes a variable-speed (e.g., inverter) compressor 112, a reversing valve 113 (e.g., a four-way valve (4WV)), an outdoor heat exchanger 114, and two valves 115-1 and 115-2 (e.g., tap or gate valves) that are connected to one another via multiple fluid lines 111-1 through 111-5 (e.g., refrigerant or gas lines). The compressor 112, reversing valve 113, outdoor heat exchanger 114, and valves 115-1 and 115-2 can each be communicatively coupled with the control system 102, e.g., via a respective wired or wireless communication channel of communication channels 14, and can each be controlled and/or actuated by the control system 102 via a respective control value.

The fluid lines 111-1 through 111-5 are configured to conduct a working fluid (e.g., a refrigerant or gas) within the ODU 110 when implementing a thermodynamic cycle (e.g., a vapor-compression or gas cycle). Valve 115-1 is connected to fluid line 111-1 to control a flow rate (e.g., a mass and/or volumetric flow rate) of the working fluid flowing in to (or out of) the ODU 110. Likewise, valve 115-2 is connected to fluid line 111-5 to control the flow rate of the working fluid flowing out of (or in to) the ODU 110. The flow rate of the working fluid through the valves 115-1 and 115-2 depends on a size of a respective opening of each valve 115-1 and 115-2, with zero size (closed) corresponding to zero flow rate and maximum size (fully open) corresponding to maximum flow rate.

The compressor 112 is connected between fluid lines 111-3 and 111-4 and is configured to compress, i.e., perform work on, the working fluid flowing between the fluid lines 111-3 and 111-4, thereby increasing the flow rate, temperature, and/or pressure of the working fluid. This is done when the working fluid is in a non-liquid phase, e.g., a vapor or gas phase. The rate of work performed on the working fluid depends on a speed ($\omega_c$) of the compressor 112, which can be measured in revolutions per minute (RPM). The direction of the working fluid flowing between fluid lines 111-3 and 111-4 may also depend on whether the speed $\omega_c$ of the compressor 112 is positive or negative. For ease of description, it is assumed that $\omega_c \geq 0$ is positive and the working fluid flows from fluid line 111-3 to fluid line 111-4 when the compressor 112 is active.

The reversing valve 113 is connected between fluid lines 111-1, 111-2, 111-3, and 111-4 and is configured to reverse a direction of the working fluid circulating in the thermodynamic cycle. The reversing valve 113 generally has two states: (i) an energized state corresponding to a forward (or backward) direction of the working fluid, and (ii) a de-energized state corresponding to a backward (or forward) direction of the working fluid. When one of the two states of the reversing valve 113 is active, e.g., corresponding to a heating mode, the working fluid flows into fluid line 111-5, through the outdoor heat exchanger 114, into fluid line 111-2, through the reversing valve 113, into fluid line 111-3, through the compressor 112, into fluid line 111-4, through the reversing valve 113 once more, and into fluid line 111-1. When the other of the two states of the reversing valve 113 is active, e.g., corresponding to a cooling mode, the working fluid flows into fluid line 111-1, through the reversing valve 113, into fluid line 111-3, through the compressor 112, into fluid line 111-4, through the reversing valve 113 once more, into fluid line 111-2, through the outdoor heat exchanger 114, and into fluid line 111-5.

The outdoor heat exchanger 114 is connected between fluid lines 111-2 and 111-5 and is configured to transfer thermal energy between the working fluid and the outdoor space 510. In general, the outdoor heat exchanger 114 is an outdoor air-to-fluid heat exchanger including: (i) an outdoor coil (e.g., an outdoor radiator coil) that the working fluid flows through, and (ii) a fan to intake ambient air from the outdoor space 510 and increase convective heat transfer. Hence, the net thermal energy transfer rate between the ODU 110 and the outdoor space 510 depends, at least in part, on a speed ($\omega_{f,1}$) of the outdoor heat exchanger 114's fan, which can be measured in RPM. In a heating mode (e.g., FIG. 6A), the outdoor heat exchanger 114 can operate as an evaporator, absorbing thermal energy from the outdoor space 510 and expanding the working fluid flowing in its outdoor coil. In a cooling mode (e.g., FIG. 6B), the outdoor heat exchanger 114 can operate as a condenser, releasing thermal energy into the outdoor space 510 and condensing the working fluid flowing in its outdoor coil.

As shown in FIG. 3A, the ODU 110 is also outfitted with multiple sensors 130 for collecting status information of the outdoor space 510 and/or the ODU 110. The sensors 130 can each be communicatively coupled with the control system 102, e.g., via a respective wired or wireless communication channel of communication channels 14, to transmit the status information to the control system 102.

Particularly, the ODU 110 includes multiple (e.g., external) sensors 130-X for collecting status information of the outdoor space 510, input (intake) air extracted from the outdoor space 510 by the outdoor heat exchanger 114, and/or output (exhaust) air expelled from the outdoor heat exchanger 114 into the outdoor space 510. The sensors 130-X include one or more flow rate sensors 130F-X for measuring a current input air flow rate and/or a current output air flow rate (e.g., a current mass and/or volumetric flow rate). Examples of flow rate sensors 130F include, but are not limited to, differential pressure flow rate sensors, electromagnetic flow rate sensors, heat transfer flow rate sensors, ultrasonic flow rate sensors, thermal flow rate sensors, condensation flow rate sensors, among others. The sensors 130-X further include one or more temperature sensors 130T-X for measuring a current ambient temperature ($\hat{I}_{n,a}$) of the outdoor space 510, a current input air temperature, and/or a current output air temperature. The sensors 130-X further include one or more humidity sensors 130H-X for measuring a current ambient humidity ($\hat{H}_{n,a}$) of the outdoor space 510, a current input air humidity, and/or a current output air humidity. Note, to measure flow rate, temperature, and/or humidity of the input or output air, a flow rate sensor 130-F, temperature sensor 130-T, and/or humidity sensor 130-H can be positioned proximate to the outdoor heat exchanger 114's fan, e.g., positioned on a vent of the ODU 110 that the input air passes into or the output air is expelled from.

The ODU 110 further includes multiple (e.g., internal) sensors 130-I for collecting status information of the working fluid flowing within the ODU 110, e.g., measuring a respective current state of the working fluid (e.g., in a liquid, vapor, gas, or mixed phase) at each of one or more thermodynamic points in the thermodynamic cycle, such as (1) a saturated vapor point, (2) a superheated vapor point, (4) a saturated liquid point, and/or (5) a mixed liquid and vapor point in a vapor-compression cycle.

The sensors 130-I include a flow rate sensor 130F-I positioned on fluid line 111-3 for measuring a current flow rate (e.g., a current mass and/or volumetric flow rate) of the working fluid flowing within the ODU 110. The sensors 130-I also include three temperature sensors 130T-I-1, 130T-I-2, and 130T-I-3 and three pressure sensors 130P-I-1, 130P-I-2, and 130P-I-3 positioned on fluid lines 111-3, 111-4, and 111-5, respectively, for measuring a respective current temperature and pressure of the working fluid flowing through each of the fluid lines 111-3, 111-4, and 111-5. Examples of pressure sensors 130P include, but are not limited to, potentiometric pressure sensors, inductive pressure sensors, capacitive pressure sensors, piezoelectric pressure sensors, strain gauge pressure sensors, variable reluctance pressure sensors, aneroid barometer pressure sensors, manometer pressure sensors, bourdon tube pressure sensors, vacuum pressure sensors, among others. The sensors 130-I may also measure (at least a portion of) a current charge (or mass) of the working fluid, e.g., based on the current flow rate, temperature, and/or pressure of the working fluid, and the total length of fluid lines in the ODU 110, e.g., according to the ideal gas law.

In some implementations, the sensors 130 may include microphone, accelerometer, and/or other acoustic and vibration sensors for measuring noise and/or vibrations generated by the ODU 110. The sensors 130 may also include current and voltage sensors for measuring the real electrical power consumed by parts or the whole of the ODU 110.

Figure 3B:
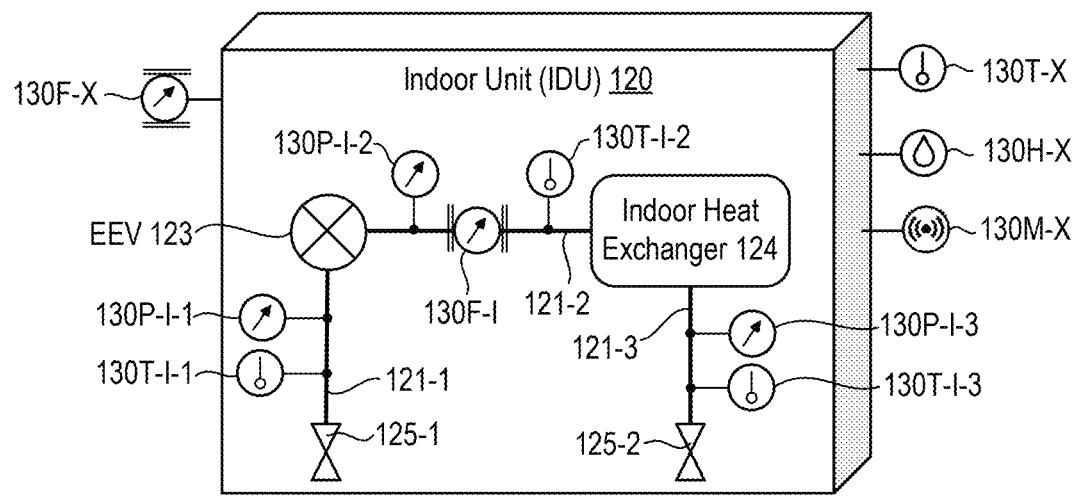
FIG. 3B is a schematic diagram depicting an example of an indoor unit (IDU).

FIG. 3B is a schematic diagram depicting an example of an IDU 120. The IDU 120 is configured to transfer thermal energy to or from an indoor space 520 in accordance with one or more control values, e.g., included in a control input for a heat pump 100 configured with the IDU 120.

The IDU 120 includes an electronic expansion valve (EEV) 123 (e.g., a thermal expansion valve (TXV)), an indoor heat exchanger 124, and two valves 125-1 and 125-2 (e.g., tap or gate valves) that are connected to one another via multiple fluid lines 121-1 through 121-3 (e.g., refrigerant or gas lines). The electronic expansion valve 123, indoor heat exchanger 124, and valves 125-1 and 125-2 can each be communicatively coupled with the control system 102, e.g., via a wired or wireless communication channel of communication channels 14, and can each be controlled and/or actuated by the control system 102 via a respective control value.

The fluid lines 121-1 through 121-3 conduct a working fluid (e.g., a refrigerant or gas) within the IDU 120 when implementing a thermodynamic cycle (e.g., a vapor-compression or gas cycle). Valve 125-1 is connected to fluid line 121-1 to control a flow rate (e.g., a mass and/or volumetric flow rate) of the working fluid flowing in to (or out of) the IDU 120. Likewise, valve 125-2 is connected to fluid line 121-3 to control the flow rate of the working fluid flowing out of (or in to) the IDU 120. The flow rate of the working fluid through the valves 125-1 and 125-2 depends on a size of a respective opening of each valve 125-1 and 125-2, with zero size (closed) corresponding to zero flow rate and maximum size (fully open) corresponding to maximum flow rate.

The electronic expansion valve 123 is connected between fluid lines 111-1 and 111-2 and is configured to expand and/or change a phase of the working fluid circulating in the thermodynamic cycle. In general, the change in flow rate, temperature, and/or pressure of the working fluid through the electronic expansion valve 123 depends on a size of an opening of the electronic expansion valve 123. The size of the opening can be determined by the control system 102 based on the demand of a heat pump 100 configured with the IDU 120. For example, the control system 102 can instruct a step motor to open or close the electronic expansion valve 123 to a certain size to regulate the amount of working fluid released into a heat exchanger 114 or 124 operating as an evaporator, e.g., such that the superheat of the working fluid flowing out of the evaporator is maintained at a steady value, e.g., a value with no portion of the working fluid in a non-liquid phase before entering a compressor 112 of an ODU 110.

The indoor heat exchanger 124 is connected between fluid lines 111-2 and 111-3 and is configured to transfer thermal energy between the working fluid and the indoor space 520. In general, the indoor heat exchanger 124 is an indoor air-to-fluid heat exchanger including: (i) an indoor coil (e.g., an indoor radiator coil) that the working fluid flows through, and (ii) a fan to intake air residing in the indoor space 520 and increase convective heat transfer. Hence, the net thermal energy transfer rate between the IDU 120 and the indoor space 520 depends, at least in part, on a speed ($\omega_{f,2}$) of the indoor heat exchanger 124's fan, which can be measured in RPM. In a heating mode (e.g., FIG. 6A), the indoor heat exchanger 124 can operate as a condenser, releasing thermal energy into the indoor space 520 and condensing the working fluid flowing in its indoor coil. In a cooling mode (e.g., FIG. 6B), the indoor heat exchanger 124 can operate as an evaporator, absorbing thermal energy from the indoor space 520 and expanding the working fluid flowing in its indoor coil.

As shown in FIG. 3B, the IDU 120 is also outfitted with multiple sensors 130 for collecting status information of the indoor space 520 and/or the IDU 120. The sensors 130 can each be communicatively coupled with the control system 102, e.g., via a respective wired or wireless communication channel of communication channels 14, to transmit the status information to the control system 102.

Particularly, the IDU 120 includes multiple (e.g., external) sensors 130-X for collecting status information of the indoor space 520, input (intake) air extracted from the indoor space 520 by the indoor heat exchanger 124, and/or output (exhaust) air expelled from the indoor heat exchanger 124 into the indoor space 520. The sensors 130-X include one or more flow rate sensors 130F-X for measuring a current input air flow rate and/or a current output air flow rate (e.g., a current mass and/or volumetric flow rate). The sensors 130-X further include one or more temperature sensors 130T-X for measuring a current temperature ($\hat{I}_{n,i}$) of the indoor space 520, a current input air temperature, and/or a current output air temperature. The sensors 130-X further include one or more humidity sensors 130H-X for measuring a current humidity ($\hat{H}_{n,i}$) of the indoor space 520, a current input air humidity, and/or a current output air humidity. Note, to measure flow rate, temperature, and/or humidity of the input or output air, a flow rate sensor 130-F, temperature sensor 130-T, and/or humidity sensor 130-H can be positioned proximate to the indoor heat exchanger 124's fan, e.g., positioned on a vent of the IDU 120 that the input air passes into or the output air is expelled from. Here, the sensors 130-X also include a presence sensor 130M-X for measuring a current occupancy ($\hat{O}_{n,i}$) of the indoor space 520.

The IDU 120 further includes multiple (e.g., internal) sensors 130-I for collecting status information of the working fluid flowing within the IDU 120, e.g., measuring a respective state of the working fluid (e.g., in a liquid, vapor, gas, or mixed phase) at each of one or more different thermodynamic points in the thermodynamic cycle, such as (1) a saturated vapor point, (2) a superheated vapor point, (4) a saturated liquid point, and/or (5) a mixed liquid and vapor point in a vapor-compression cycle.

The sensors 130-I include a flow rate sensor 130F-I positioned on fluid line 121-2 for measuring a current flow rate (e.g., a current mass and/or volumetric flow rate) of the working fluid flowing within the IDU 120. The sensors 130-I also include three temperature sensors 130T-I-1, 130T-I-2, and 130T-I-3 and three pressure sensors 130P-I-1, 130P-I-2, and 130P-I-3 positioned on fluid lines 121-1, 121-2, and 121-3, respectively, for measuring a respective current temperature and pressure of the working fluid flowing through each of the fluid lines 121-1, 121-2, and 121-3. The sensors 130-I may also measure (at least a portion of) a current charge (or mass) of the working fluid, e.g., based on the current flow rate, temperature, and/or pressure of the working fluid, and the total length of fluid lines within the IDU 120, e.g., according to the ideal gas law.

In some implementations, the sensors 130 may include microphone, accelerometer, and/or other acoustic and vibration sensors for measuring noise and/or vibrations generated by the IDU 120. The sensors 130 may also include current and voltage sensors for measuring the real electrical power consumed by parts or the whole of the IDU 120.

Figure 4A:
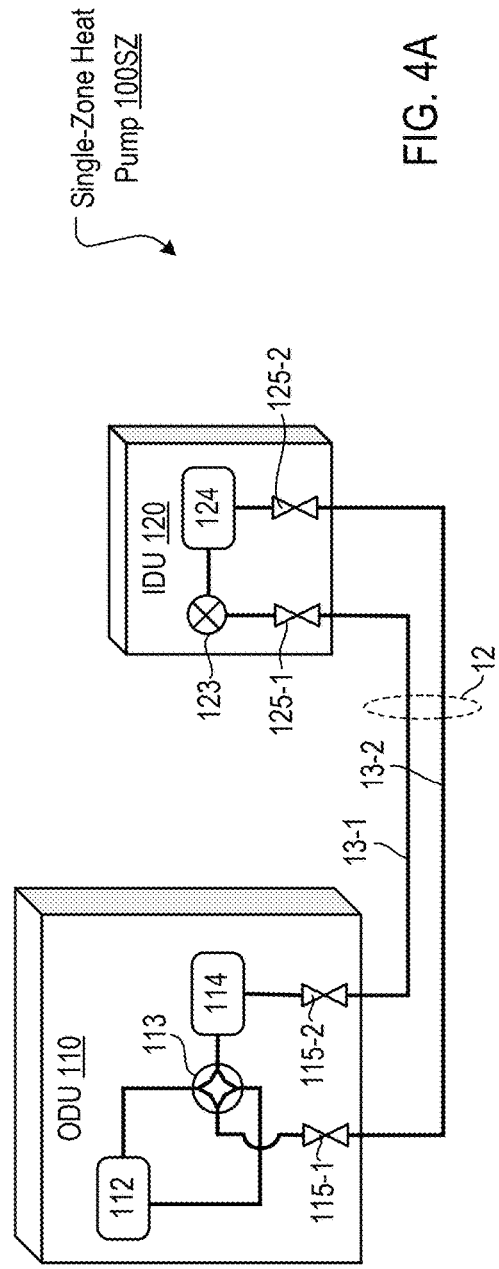
FIG. 4A is a schematic diagram depicting an example of a single-zone heat pump including an ODU and an IDU.

FIG. 4A is a schematic diagram depicting an example of a single-zone heat pump 100SZ. The single-zone heat pump 100SZ includes an ODU 110 and an IDU 120 configured similarly to FIGS. 3A and 3B, respectively.

The ODU 110 and IDU 120 are thermally coupled to each other via a set of fluid lines 12. The fluid lines 12 includes a first (e.g., input or output) fluid line 13-1 connected between valves 115-2 and 125-1, and a second (e.g., output or input) fluid line 13-2 connected between valves 115-1 and 125-2. The fluid lines 12 circulate a working fluid between the ODU 110 and IDU 120 in a forward or backward direction depending on the energized or de-energized state of the reversing valve 113, corresponding to a heating mode (e.g., FIG. 6A) or a cooling mode (e.g., FIG. 6B).

Here, a control input ($u_j$) for the single-zone heat pump 100SZ can include a respective control value for each of: (i) the speed of the compressor 112, (ii) the energized or de-energized state of the reversing valve 113, (iii) the speed of the outdoor heat exchanger 114's fan, (iv) the speed of the indoor heat exchanger 124's fan, (v) the size of the opening of the electronic expansion valve 123, and (vi) the respective size of the opening of each of the valves 115-1, 115-2, 125-1, and 125-2.

FIG. 6A is a schematic diagram depicting an example model of the single-zone heat pump 100SZ when implementing a vapor-compression cycle in a heating mode 600A, that is, to heat an indoor space 520. FIG. 6B is a schematic diagram depicting an example model of the single-zone heat pump 100SZ when implementing the vapor-compression cycle in a cooling mode 600B, that is, to cool the indoor space 520. FIG. 6C is a phase diagram 610 depicting an example of the vapor-compression cycle that can be implemented by the single-zone heat pump 100SZ. The phase diagram 610 shows different phases of a refrigerant circulating in the vapor-compression cycle as a function of specific entropy and temperature of the refrigerant. Isobars in the phase diagram 610 refer to contours of constant pressure of the refrigerant.

As shown in FIG. 6A, when operating in the heating mode 600A, (1) to (2) corresponds to compression of the refrigerant via the compressor 112 by performing work ($P_c$) 312 on the refrigerant, e.g., in accordance with the speed ($\omega_c$) of the compressor 112.

(2) to (3) and (3) to (4) correspond to transfer of super and latent heat (Q) 324 in the refrigerant to the indoor space 520 via the indoor heat exchanger 124, aided by power ($P_{f,2}$) 325 consumed by the indoor heat exchanger 124's fan, e.g., in accordance with the speed ($\omega_{f,2}$) of the fan.

(4) to (5) corresponds to expansion of the refrigerant via the electronic expansion valve 123.

(5) to (1) corresponds to transfer of heat ($Q_a$) 314 from an outdoor space 510 to the refrigerant via the outdoor heat exchanger 114, aided by power ($P_{f,1}$) 325 consumed by the outdoor heat exchanger 114's fan, e.g., in accordance with the speed ($\omega_{f,1}$) of the fan.

As shown in FIG. 6B, when operating in the cooling mode 600B, (1) to (2) corresponds to compression of the refrigerant via the compressor 112 by performing work 312 on the refrigerant, e.g., in accordance with the speed of the compressor 112.

(2) to (3) and (3) to (4) correspond to transfer of super and latent heat 314 in the refrigerant to the outdoor space 510 via the outdoor heat exchanger 114, aided by power 325 consumed by the outdoor heat exchanger 114's fan, e.g., in accordance with the speed of the fan.

(4) to (5) corresponds to expansion of the refrigerant via the electronic expansion valve 123.

(5) to (1) corresponds to transfer of heat 324 from the indoor space 520 to the refrigerant via the indoor heat exchanger 124, aided by power 325 consumed by the indoor heat exchanger 124's fan, e.g., in accordance with the speed of the fan.

Figure 4B:
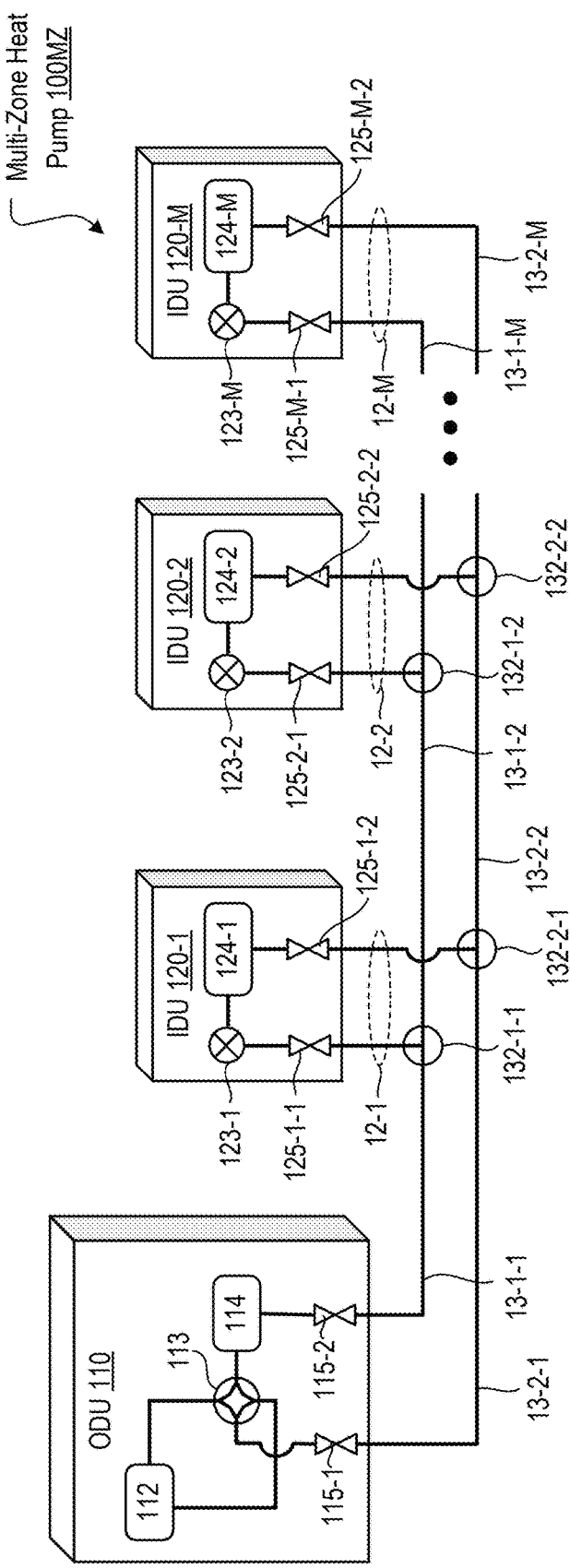
FIG. 4B is a schematic diagram depicting an example of a multi-zone heat pump including an ODU and multiple IDUs.

FIG. 4B is a schematic diagram depicting an example of a multi-zone heat pump 100MZ. The multi-zone heat pump 100MZ includes an ODU 110 and multiple IDUs 120-1 through 120-M, where the ODU 110 and each IDU 120-1 through 120-M is configured similarly to FIGS. 3A and 3B, respectively.

The ODU 110 is thermally coupled to each IDU 120-1 through 120-(M-1) via a respective first three-way valve (3WV) 132-1 positioned on a first (e.g., input or output) fluid channel 13-1, and a respective second 3WV 132-2 positioned on a second (e.g., output or input) fluid channel 13-2. Here, fluid channel 13-1 includes multiple fluid lines 13-1-1 through 13-1-M interconnecting 3WVs 132-1-1 through 132-1-M. Similarly, fluid channel 13-2 includes multiple fluid lines 13-2-1 through 13-2-(M-1) interconnecting 3WVs 132-2-1 through 132-2-(M-1).

In general, a 3WV 132 can be configured into one of multiple types of diverting patterns. Such diverting patterns include: (i) a three-way pattern (e.g., a T-pattern) that allows flow of a working fluid in to and out of each of the 3WV 132's three ports, and (ii) multiple two-way patterns (e.g., L-patterns and straight-line patterns) that allow flow of the working fluid in to and out of two of the 3WV 132's three ports. The 3WVs 132 can each be communicatively coupled with the control system 102, e.g., via a respective wired or wireless communication channel of communication channels 14, and can each be controlled and/or actuated by the control system 102 via a respective control value.

The ODU 110 has fluid lines 13-1-1 and 13-2-1 connected to its valves 115-1 and 115-2. Each IDU 120-1 through IDU 120-(M-1) has a respective set of fluid lines 12 connected between its 3WVs 131-1 and 131-2 and its valves 125-1 and 125-2. IDU 120-M has fluid lines 13-1-M and 13-2-M directly connected to its valves 125-M-1 and 125-M-2. The fluid channels 13-1 and 13-2 circulate a working fluid between the ODU 110 and each IDU 120-1 and 120-M in a forward direction or a backward direction depending on the energized or de-energized state of the reversing valve 113, corresponding to a heating or cooling mode. The heating and cooling modes for the multi-zone heat pump 100MZ are similar to that of the single-zone heat pump 100SZ except the working fluid is diverted to and from multiple IDUs 120. Particularly, the multi-zone heat pump 100MZ corresponds to multiple IDUs 120 placed in parallel with one another and, therefore, the ODU 110 effectively sees a single, equivalent IDU 120.

Here, a control input (u;) for the multi-zone heat pump 100MZ can include a respective control value for each of: (i) the speed of the compressor 112, (ii) the energized or de-energized state of the reversing valve 113, (iii) the speed of the outdoor heat exchanger 114's fan, (iv) the respective speed of each of the indoor heat exchangers' 124-1 through 124-M fans, (v) the respective size of the opening of each of the electronic expansion valves 123-1 through 123-M, (vi) the respective diverting pattern for each of the 3WVs 132-1 through 132-(M-1), and (vii) the respective size of the opening of each of the valves 115-1, 115-2, and 125-1 through 125-M.

FIG. 7A is a schematic diagram depicting an example of an indoor space 520 configured with an IDU 120 of a heat pump 100. For example, the indoor space 520 can be a studio apartment in an apartment building.

The IDU 120 is a thermal source (or sink) providing a net thermal energy transfer rate (Q) between the IDU 120 and the indoor space 520. When considering FIGS. 6A-6B, the net thermal energy transfer rate depends, at least in part, on a control input for the heat pump 100, a temperature and humidity of the indoor space 520, and an ambient temperature and humidity of an outdoor space 510 that an ODU 110 of the heat pump 100 is positioned in.

The indoor space 520 is thermally coupled 410 to the outdoor space 510 via an outer wall 512 that includes a window 526. The thermal coupling 410 between the indoor space 520 and the outdoor space 510 may depend on the occupancy of the indoor space 520, e.g., due to an occupant 201 opening or closing the window 526.

The indoor space 520 is also thermally coupled 420 to each of multiple, other indoor spaces 520-1 through 520-5 via a respective inner wall 522 (or floor or ceiling). Wall 522-5 also includes a door 524. Hence, thermal coupling 520-5 may also depend on the occupancy of the indoor space 520, e.g., due to an occupant 201 opening or closing the door 524.

The indoor space 520 further includes a thermostat 220, an appliance 528 (e.g., a washer and/or dryer), and an occupant 201 of the indoor space 520 positioned therein. The appliance 528 and occupant 201 are another thermal energy source providing a net thermal energy transfer rate ($Q_s$) 301 from the appliance 528 and occupant 201 to the indoor space 520. This may also depend on the occupancy of the indoor space 520, e.g., due to the occupant 201 turning the appliance 528 on or off and radiative heat from the occupant 201.

The Sun 514 is yet another thermal energy source providing a net solar thermal energy transfer rate ($Q_e$) 344 from the outdoor space 510 to the indoor space 520. Here, the net solar thermal energy transfer rate may depend on the overcast of the outdoor space 510 and/or the coordinate of the Sun 514.

FIG. 7B depicts an example thermal model 520-MOD of the indoor space 520 in FIG. 7A. As shown in FIG. 7B, the thermal model 520-MOD includes a thermal capacitance (C) and the temperature (T) of the indoor space 520, the ambient temperature ($T_a$) of the outdoor space 510, the respective temperature ($T_i$) of each adjacent indoor space 520-1 through 520-5, the thermal couplings 410 and 420 between each of the spaces 510 and 520, and each of the net thermal energy transfer rates 301, 324, and 344.

The thermal coupling 410 between the indoor space 520 and the outdoor space 510 can be modelled by two thermal capacitances $C_{e,1}$ and $C_{e,2}$ and temperatures $T_{e,1}$ and $T_{e,2}$ for the surfaces of the outer wall 512, three thermal resistances $R_{e,1}$, $R_{e,2}$, and $R_{e,3}$, and a thermal resistance $R_w$ for the window 526. However, in a simplified version of the thermal model 520-MOD, e.g., when the temperatures of the outer wall 512 are not modelled, the thermal coupling 410 can be represented as a thermal resistance Re between the indoor space 520 and the outdoor space 510 in parallel with the thermal resistance of the window 526.

The thermal coupling 420 between the indoor space 520 and an adjacent indoor space 520-$i$ can be modelled by two thermal capacitances $C_{i,1}$ and $C_{i,2}$ and temperatures $T_{i,1}$ and $T_{i,2}$ for the surfaces of the inner wall 522-$i$, and three thermal resistances $R_{i,1}$, $R_{i,2}$, and $R_{i,3}$. However, in the simplified version of the thermal model 520-MOD, e.g., when the temperatures of the inner wall 522-$i$ are not modelled, the thermal coupling 420 can be represented as a thermal resistance $R_i$ between the indoor space 520 and the adjacent indoor space 520-$i$.

Thus, in a simplified version of the thermal model 520-MOD, the rate of change of the temperature (T) of the indoor space 520 may be represented, at least approximately, as:

$$C\dot{T} = Q + Q_e + Q_s + \left(\frac{1}{R_e} + \frac{1}{R_W}\right)(T_a - T) + \sum_{i=1}^{5} \frac{T_i - T}{R_i}, \quad (1a)$$

where the overdot indicates the derivative with respect to time. The net thermal energy transfer rate (H) between the IDU 120 and the indoor space 520 may be represented, at least approximately, as:

$$Q = m_{ex}[C_p(T_{ex}-T) + C_{pw}(H_{ex}T_{ex}-HT)]. \quad (1b)$$

$C_p$ is the specific heat of air, $C_{pw}$ is the specific heat of water vapor at zero degrees Celsius. $m_{ex}$, $T_{ex}$, and $H_{ex}$ are the exhaust air mass flow rate, temperature, and humidity ratio of air expelled from the IDU 120, respectively. H is the humidity ratio of the indoor space 520. The rate of change of the humidity (H) of the indoor space 520 can then be represented, at least approximately, as:

$$\rho V \dot{H} = m_{ex}(H_{ex} - H), \quad (1c)$$

where $\rho$ and V are the density and volume of air residing in the indoor space 520, respectively. To linear order, the rate of change of the occupancy (O) of the indoor space 520 may be represented, at least approximately, as:

$$\dot{O} = \alpha_T T + \alpha_H H + \alpha_O O + \alpha_u u, \quad (1d)$$

where $\alpha_T$, $\alpha_H$, and $\alpha_O$ are coefficients for the temperature, humidity, and occupancy of the indoor space 520, respectively, and $\alpha_u$ is a coefficient for the control input for the heat pump 100. Furthermore, Eqs. (1a)-(1d) can be discretized, e.g., using a finite difference method $\dot{x} \approx [x(t+\Delta t) - x(t)]/\Delta t$, to approximate the time derivatives and obtain an equation of the form $x_{n+1} = f(x_n, u_n; \theta_n)$, where f represents the thermal model 520-MOD of the indoor space 520, $x_n$ is the state of the indoor space 520 at a time step, $u_n$ is a control input for the heat pump 100 at the time step, and $\theta_n$ are the parameters of the thermal model 520-MOD at the time step.

Note, the thermal model 520-MOD of the indoor space 520 is merely one (simplified) example of a thermal model. As described in more detail with reference to FIG. 8A, the control system 102 can use thermal models of varying complexities, e.g., both linear and nonlinear, to model the behavior of one or more indoor spaces 520.

Figure 8A:
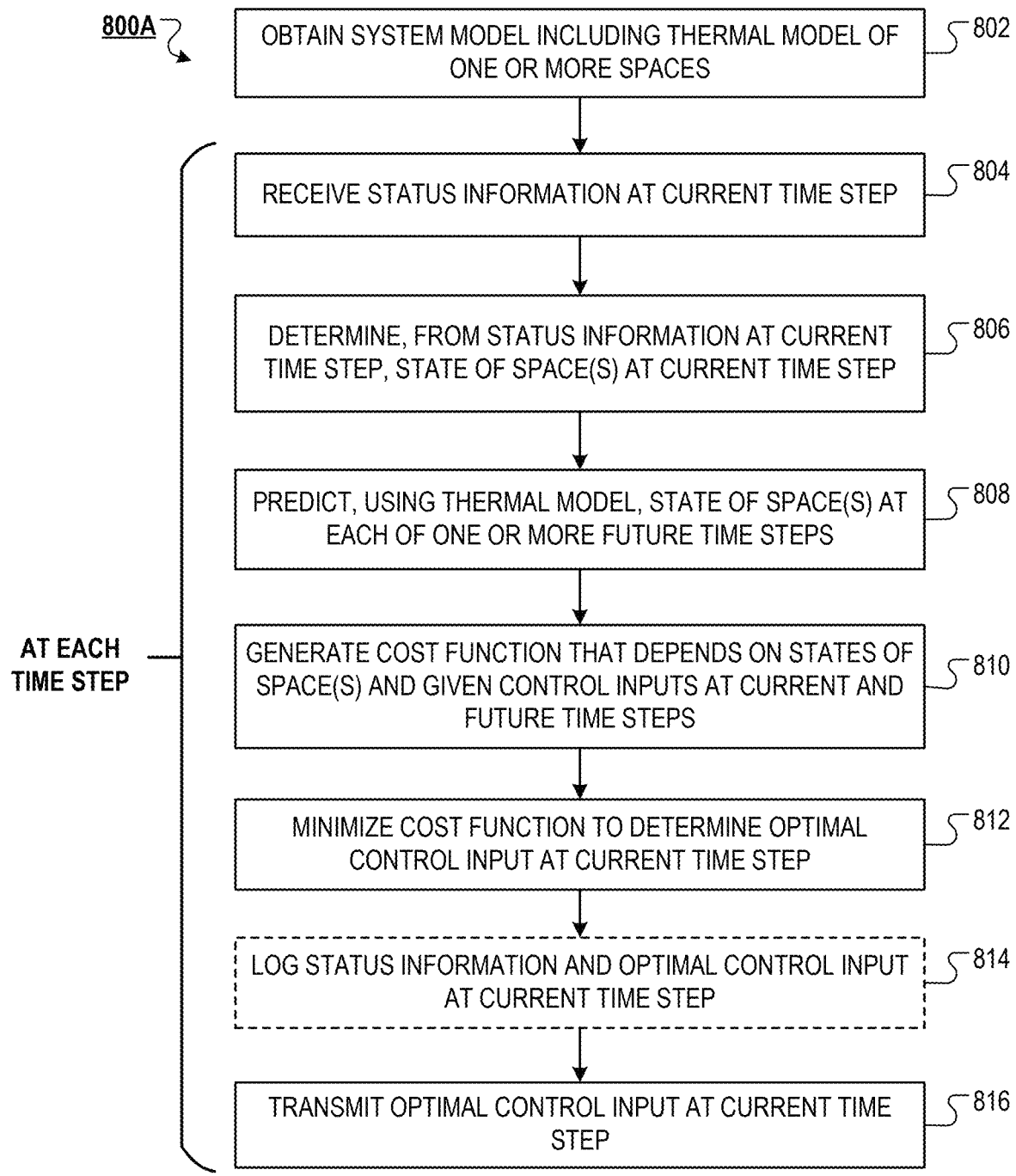
FIG. 8A is a flow diagram of an example process for controlling a heat pump system with a control device currently configured as a main control device.

FIG. 8A is a flow diagram of an example process 800A for controlling the heat pump system 10 with a control device 106* currently configured as the main control device 104. In general, the main control device 104 is configured to execute the model predictive control algorithm to compute the optimal control sequence u*(.) for the set of heat pumps 100, where the optimal control sequence includes a respective optimal control input ($u_n$*) at each time step.

Note, the control system 102 may perform different operations for selecting the control device 106* before configuring the control device 106* as the main control device 104. For example, the control system 102 can receive, e.g., via the user controls 200, a user input assigning the control device 106* to be configured as the main control device 104. As another example, the control system 102 can randomly select the control device 106* to be configured as the main control device 104. As yet another example, the control system 102 can elect the control device 106* to be configured as the main control device 104, e.g., by implementing a voting system.

In more detail, the main control device 104 first obtains a system model including a thermal model (f) of the indoor space(s) 520 (802).

From the thermal model, the main control device 104 can determine: the amount of thermal energy in to or out of each of the indoor space(s) 520 that is involved to maintain a setpoint or follow a desired schedule for the indoor space(s) 520; how outdoor weather conditions (past, present, and forecasted) affect indoor conditions over time; how outdoor temperature and humidity affect indoor temperature and humidity, how wind speed and direction affect the temperature of the indoor space(s) 520; how solar loading and daytime and nighttime cloud cover affect the temperature of the indoor space(s) 520; and how temperatures of the spaces 510 and 520 are thermally coupled to one another.

The main control device 104 can obtain the thermal model based on, e.g., thermal property data of a building, an assumed thermal model of the building, and/or logged status information of the spaces 510 and 520 of the building. The thermal model can be represented mathematically as:

$$x_{n+1} = f(x_n, u_n; \theta_n). \quad (2a)$$

The thermal model characterizes a state ($x_{n+1}$) of the indoor space(s) 520 at a sequential time step in response to: (i) a state ($x_n$) of the indoor space(s) 520 at a given time step, and (ii) a given control input ($u_n$) for the set of heat pumps 100 at the given time step. Note, a state $x_n = \{x_{n,i}\}_{i=1}^{D}$ of the indoor space(s) 520 at a given time step can be further discretized into a respective state ($x_{n,i}$) of each indoor space 520 at the given time step. Furthermore, to reiterate, a state $x_{n,i} = (T_{n,i}, H_{n,i}, O_{n,i})$ of an indoor space 520 at a given time step can include a temperatures ($T_{n,i}$), humidity ($H_{n,i}$), and occupancy ($O_{n,i}$) of the indoor space 520 at the given time step. As shown in Eq. (2a), the thermal model is parameterized by a set of model parameters ($\theta_n$) that are allowed to vary at each time step, e.g., according to the state ($x_{n,a}$) of the outdoor space 510 at the time step $\theta_n = \theta(x_{n,a})$, which accounts for multiplicative and/or additive disturbances to $x_n$ and $u_n$.

Note, when modeling the occupancies of the indoor space(s) 520, the thermal model generally includes a behavior (or occupancy) model of one or more occupants of the indoor space(s) 520, e.g., the (joint) probability of the indoor space(s) 520 being occupied by each of the one or more occupants. The main control device 104 can build the behavioral model based on past and current occupancy data, e.g., user inputs and occupancy schedules received from the user controls 200, biometric data received from the user device(s) 210, and presence data received from presence sensors 130-X. For example, the behavior model can be a learned model, e.g., a machine learning model, that the main control device 104 trains on the occupancy data to estimate occupancy and activities that generate heat and/or moisture such as cooking, and opening windows and doors. Hence, the behavior model can predict when the indoor space(s) 520 will be occupied and need to be comfortable, when and how much additional heating and humidity loads may occur, as well as changes in the thermal model due to changes in ventilation (e.g., exchanging air to the outdoor space 510) and circulation of air between the indoor space(s) 520. The main control device 104 can use the behavior model to differentiate and locate occupants in a home (e.g., using gait detection), as well as automatically adjust a set point schedule and/or control settings (e.g., maximum fan speed) to tradeoff between comfort and energy consumption, among other features.

In some implementations, the system model also includes a performance model (g) of the set of heat pumps 100. The main control device 104 can obtain the performance model based on, e.g., engineering and laboratory data of the ODUs 110 and IDUs 120, and/or logged control and status information of the set of heat pumps 100. Mathematically, the performance model can be represented as:

$$p_n = g(u_n; \varphi_n). \tag{2b}$$

The performance model characterizes a set of performance metrics ($p_n$) of the set of heat pumps 100 at a given time step in response to a given control input for the set of heat pumps 100 at the given time step. In general, a set of performance metrics $p_n = \{p_{n,j}\}_{j=1}^{N}$ at a given time step can be further discretized into a respective set of performance metrics ($p_{n,j}$) for each heat pump 100 at the given time step. Moreover, a set of performance metrics $p_{n,j} = (Q_{n,j}, P_{n,j})$ for a heat pump 100 at a given time step can include a net thermal energy transfer rate ($Q_{n,j}$) and a net power consumption ($P_{n,j}$) of the heat pump 100 at the given time step. The ratio of these metrics, that is, $COP_{n,j} = |Q_{n,j}|/P_{n,j}$, provides the coefficient of performance (COP) of the heat pump 100, characterizing the energy efficiency of the heat pump 100. As shown in Eq. (2b), the performance model is parameterized by a set of model parameters ($\varphi_n$) that are allowed to vary at each time step, e.g., according to the states of the spaces 510 and 520 at the time step $\varphi_n = \varphi(x_n, x_{n,a})$, which accounts for multiplicative and/or additive disturbances to $u_n$.

Using the thermal and performance models in the model predictive control algorithm, the main control device 104 can minimize the energy consumption or energy costs associated with heating, cooling, and humidity control, while meeting the comfort requirements of the occupants, given the heat pump system 10 capabilities and limitations. Particularly, the main control device 104 can compute the optimal operation of the heat pump system 10 to estimate the current state of the heat pump system 10; predict the future state of the heat pump system 10; account for constraints such as setpoint schedules and safety requirements (e.g., to prevent the home from freezing or becoming too humid even when unoccupied); and utilize a cost function that weighs energy use and cost against soft comfort constraints such as small temperature deviations, air flow speed, and noise level. As described in more detail, the cost function generally encompasses a set of possible futures by taking into account, e.g., the statistical nature of some of the aspects, such as predicted occupancy and weather forecasts.

For example, a wide allowable temperature range for unoccupied spaces 520 affords the main control device 104 the freedom to let the temperature drift substantially, but using the available models, the main control device 104 can choose not to drift the temperature so much that inefficient high-power operation is involved to bring the unoccupied space 520 back to a comfortable temperature when occupied. To accomplish this, the main control device 104 can predict when an unoccupied space 520 will again be occupied and, using the thermal and performance models, determines the optimal temperature setback profile over time that realizes maximum energy savings for unoccupied spaces 520 while still efficiently preconditioning the space 520 at the appropriate time in anticipation of occupancy (see FIGS. 9A-9C for example).

Particularly, at each time step ($t_n$)), the main control device 104 performs the following processes (804)-(816):

The main control device 104 receives (e.g., samples), from the sensors 130, status information ($s_n$) at the current time step (804).

Note, a sample ($s_n$) of status information can include status information collected by some or all of the sensors 130 of the heat pump system 10 at the current time step. Hence, the status information at the current time step can include data characterizing the state of the indoor space(s) 520, the state of the outdoor space 510, and the state of the set of heat pumps 100 at the current time step.

The main control device 104 determines, from the status information at the current time step, a state ($\hat{x}_n$) of the indoor space(s) 520 at the current time step (806), e.g., as an estimate and/or measurement of the state of the indoor space(s) 520 at the current time step. In a similar vein, the main control device 104 can also determine a state ($\hat{x}_{n,a}$) of the outdoor space 510 at the current time step from the status information at the current time step.

The main control device 104 then predicts, using the thermal model, a respective state ($x_{n+k+1}$) of the indoor space(s) 520 at each of one or more future time steps in response to: (i) the state ($x_n$) of the indoor space(s) 520 at the current time step, and (ii) a respective given control input ($u_{n+k}$) for the set of heat pumps 100 at each of the current and future time steps (808).

Starting from the current states of the spaces 510 and 520, that is, for the initializations $x_n = \hat{x}_n$ and $x_{n,a} = \hat{x}_{n,a}$, the process (808) can be represented mathematically by the recursive formula:

$$x_{n+k+1} = f(x_{n+k}, u_{n+k}; \theta_{n+k}). \tag{3a}$$

As shown in Eq. (3a), the main control device 104 uses the current and predicted, future values of the thermal model's parameters ($\theta_{n+k}$) when optimizing for time steps n+k. Here, k=0, 1, . . . , K−1 defines a prediction horizon over the current k=0 and future k>0 time steps, and K≥2 corresponds to a terminal future time step.

For example, using a weather forecast $x_a'(.)$ including a respective predicted state ($x''_{n,a}$) of the outdoor space 510 at each time step, the main control device 104 can predict the thermal model's parameters $\theta_{n+k} = \theta(x_{n+k,a}')$ for each of the future time step(s).

The main control device 104 can perform a similar procedure using the performance model. Particularly, the main control device 104 can predict, using the performance model, a respective set of performance metrics ($p_{n+k}$) of the set of heat pumps 100 at each of the current and future time steps in response to the respective given control input at the current or future time step. This process can be represented mathematically as:

$$p_{n+k} = g(u_{n+k}; \varphi_{n+k}). \tag{3b}$$

As shown in Eq. (3b), the main control device 104 uses the current and predicted, future values ($\varphi_{n+k}$) of the performance model's parameters when optimizing over the prediction horizon.

For example, from the thermal model and a weather forecast, the main control device 104 can use the predicted states of the spaces 510 and 520 to determine the performance model's parameters $\varphi_{n+k}=\varphi(x_{n+k}, x_{n+k,a}')$ for each of the future time step(s).

The main control device 104 then generates a cost function (J) that depends on the states of the indoor space(s) 520 and given control inputs at each of the current and future time steps (810).

The process (810) can be represented mathematically as:

$$J(K, \hat{x}_n, u_n(\cdot)) = F_n(x_{n+K}) + \sum_{k=0}^{K-1} L_{n,k}(x_{n+k}, u_{n+k}), \quad (4a)$$

where $u_n(.)=\{u_n, u_{n+1}, \ldots, u_{n+K-1}\}$ defines a given control sequence over the prediction horizon that includes the respective given control input at each of the current and future time steps.

As shown in Eq. (4a), the cost function includes, for each of the current and future time steps, a respective cost term ($L_{n,k}$) that depends on the respective state of the indoor space(s) 520 and given control input at the current or future time step. Here, the cost function further includes a terminal cost term ($F_n$) that depends on the state of the indoor space(s) 520 at the terminal future time step. In general, the main control device 104 uses the cost function to appropriately weigh the confounding factors influencing performance, efficiency, comfort, schedules, constraints, and other parameters applied to the heat pump system 10.

In some implementations, the main control device 104 splits the dependency of each cost term as:

$$L_{n,k}(x_{n+k},u_{n+k})=L_{n,k,1}(x_{n+k})+L_{n,k,2}(u_{n+k}). \quad (4b)$$

Here, each cost term includes: (i) a respective first cost term ($L_{n,k,1}$) that depends on the respective state of the indoor space(s) 520 at the current or future time step, and (ii) a respective second cost term ($L_{n,k,2}$) that depends on the respective given control input at the current or future time step.

For example, the main control device 104 can follow a temperature, humidity, and/or occupancy schedule by obtaining a reference state trajectory $x'(.)=\{x_0', x_1', x_2' \ldots \}$ including a respective reference state ($x_n'$) of the indoor space(s) 520 at each time step. Each reference state $x_n'=(T_n', H_n', O_n')$ can include a respective set of setpoint temperatures ($T_n'$), setpoint humidities ($H_n'$), and/or expected occupancies ($O_n'$) of the indoor space(s) 520, e.g., as specified by one or more user inputs via the user controls 200. Each first cost term may then be represented mathematically as:

$$L_{n,k,1}(x_{n+k})=L_1(x_{n+k},x_{n+k}'). \quad (4c)$$

As shown in Eq. (4c), each first cost term includes a respective error between: (i) the respective state of the indoor space(s) 520, and (ii) the respective reference state of the indoor space(s) 520, at the current or future time step. For example, the error can be a mean-squared error, an absolute error, a weighed error, or other appropriate error metric.

Alternatively, or in addition, the main control device 104 can use each second cost term to follow a reference control sequence u' (.) including a respective reference control input ($u_n'$) for the set of heat pumps 100 at each time step, e.g., as specified by a user input via the user controls 200. Each second cost term may then be represented mathematically as:

$$L_{n,k,2}(u_{n+k})=L_2(u_{n+k},u_{n+k}'). \quad (4d)$$

As shown in Eq. (4d), each second cost term includes a respective error between: (i) the respective given control input, and (ii) the respective reference control input, at the current or future time step. For example, similar to above, the error can be a mean-squared error, an absolute error, a weighed error, or other appropriate error metric.

As another example, using a peak pricing schedule $\psi(.)$ including a respective predicted price of energy ($\psi_n$) at each time step, the main control device 104 can minimize a predicted energy cost of the set of heat pumps 100 over the prediction horizon. Particularly, the main control device 104 can multiply the predicted net power consumptions of the set of heat pump 100 with the predicted price of energy to obtain the total energy cost rate $C_{n+k}=\psi_{n+k}\Sigma_j P_{n+k,j}$ at a time step. The total energy cost at the time step is then $C_{n+k}\Delta t_{n+k}$, where $\Delta t_{n+k}=t_{n+k+1}-t_{n+k}$ is the length of the time step. Here, the cost function can further include, for each of the current and future time steps, a respective energy cost term ($C_{n+k}\Delta t_{n+k}$) that depends on: (i) the respective power consumption of each heat pump 100, and (ii) the respective predicted price of energy, at the current or future time step.

After generating a suitable cost function, the main control device 104 then minimizes the cost function with respect to the given control inputs at each of the current and future time steps (812). This can be represented mathematically as:

$$u_n^*(.)=\arg\min_{u_n(.)} J(K,\hat{x}n,u_n(.)). \quad (5)$$

Eq. (5) results in an optimal control sequence $u_n^*(.)=\{u_n^*, u_{n+1}^*, \ldots, u_{n+K-1}^*\}$ over the prediction horizon that includes a respective optimal control input at each of the current and future time steps. The main control device 104 can use various optimization techniques to minimize the cost function, e.g., stochastic gradient descent (SGD) methods with a particular learning rate and/or weight decay, e.g., AdaGrad, Implicit Updates, AdamW, Momentum, among others.

Moreover, to implement one or more constraints on the heat pump system 10, e.g., as specified by one or more user inputs via the user controls 200, the main control device 104 can minimize the cost function while subject to one or more of: (i) a respective temperature bound $T_{min,i} \leq T_{n+k,i} \leq T_{max}$, for each indoor space 520, (ii) a respective humidity bound $H_{min,i} \leq H_{n+k,i} \leq H_{max,i}$ for each indoor space 520, (iii) a respective temperature fluctuation bound $|T_{n+k,i}-T_{n+k+1,i}| \leq \Delta T_i$ for each indoor space 520, (iv) a respective humidity fluctuation bound $|H_{n+k,i}-H_{n+k+1,i}| \leq \Delta H_i$ for each indoor space 520, (v) a respective control input bound $u_{min,j} \leq u_{n+k,j} \leq u_{max,j}$ for each heat pump 100, (vi) a respective control input fluctuation bound $|u_{n+k,j}-u_{n+k+1,j}| \leq \Delta u_j$ for each heat pump 100, (vii) a respective power consumption bound $P_{n+k,j} \leq P_{max,j}$ for each heat pump 100, (viii) a total energy cost rate bound $C_{n+k} \leq C_{max}$ for the set of heat pumps 100, and (ix) a total equivalent carbon dioxide ($CO_2$) output rate bound of the set of heat pumps 100.

The main control device 104 can also determine an optimal state trajectory $x_n^*(.)$ over the prediction horizon by inserting the optimal control inputs at each of the current and future time steps into the thermal model:

$$x_{n+k+1}^*=f(x_{n+k}^*,u_{n+k}^*;\theta_{n+k}), \quad (6)$$

where $x_n^*(.)=\{x_n, x_{n+1}^*, \ldots, x_{n+K}^*\}$ includes a respective optimal state of the indoor space(s) 520 at each of the current, future, and terminal future time steps. Similarly, the main control device 104 can also determine a respective optimal set of performance metrics of the set of heat pumps 100 at each of the current and future time steps by inserting the optimal control inputs over the prediction horizon into the performance model.

In some implementations, the main control device 104 logs the status information and optimal control at the current time step (814).

At the completion of the iteration, the main control device 104 transmits the optimal control input $u_n^*$ at the current time step (816).

The main control device 104 then repeats this process at the next time step $t_{n+1}$, and the next time step $t_{n+2}$, and so on.

Figure 8B:
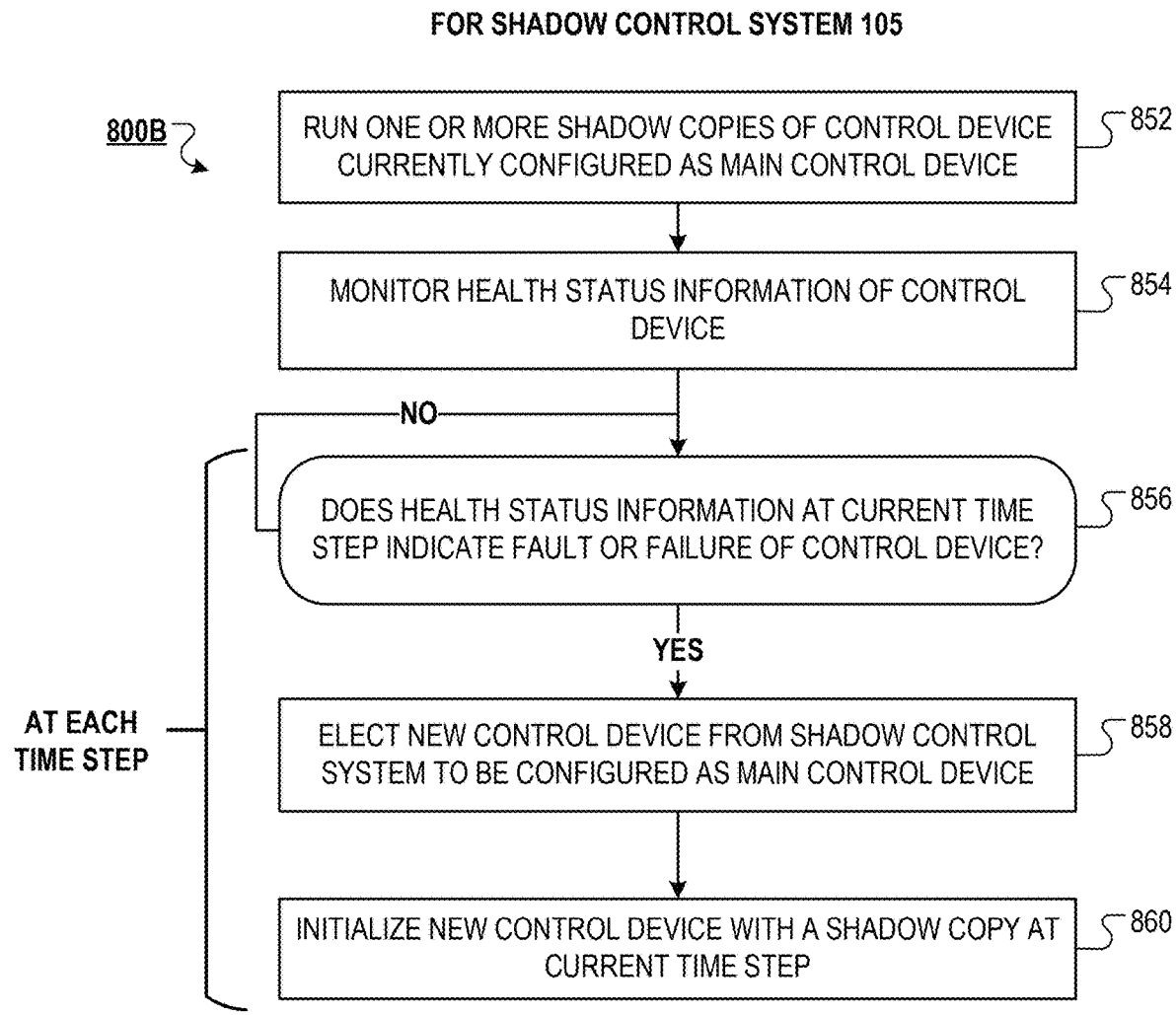
FIG. 8B is a flow diagram of an example process for monitoring a control device currently configured as a main control device with a shadow control system.

FIG. 8B is a flow diagram of an example process 800B for monitoring the control device 106* currently configured as the main control device 104 with the shadow control system 105, while the control device 106* is performing the process 800A.

The shadow control system 105 runs one or more shadow copies of the control device 106* over the time steps of the process 800A (852).

As mentioned above, in general, each shadow copy provides a current backup copy of the control device 106*'s computer volume, files, and/or system configuration. Hence, each shadow copy can include a log of the control and status information of the heat pump system 10, i.e., the historical state of the heat pump system 10. Using such data, the shadow control system 105 can provide information on parts of the heat pump system 10 that are currently down, e.g., errors that were logged before a part of the heat pump system 10 fatally failed.

In some implementations, each control device 106 in the shadow control system 105 runs a respective shadow copy of the control device 106* over the time steps, e.g., such that, upon election from the shadow control system 105, a new control device 106** can immediately load a shadow copy of the control device 106* stored in its memory 52. In other implementations, each control device 106 in the shadow control system 105 may run a respective portion of a shadow copy of the control device 106* the time steps, e.g., such that each shadow copy is distributed between one or more control devices 106 in the shadow control system 105.

The shadow control system 105 monitors health status information of the control device 106* over the time steps of the process 800A (854).

For example, health status information of the control device 106* can include a temperature of the control device 106*, a clock speed of the control device 106*'s processing circuitry 50, a total usage of the control device 106*'s memory 52, data (or digital) degradation of the control device 106*'s memory 52, static or dynamic faults of the control device 106*, the quality of the control device 106*'s communication channels 15, 22, or 62, among other health status information.

In some implementations, each control device 106 in the shadow control system 105 can monitor a respective portion of the health status information of the control device 106* over the time steps, e.g., such that monitoring is distributed amongst the control devices 106 in the shadow control system 105.

At each time step, the shadow control system 105 performs the following processes (856)-(858):

The shadow control system 105 determines whether the health status information at the current time step indicates a fault or failure of the control device 106* (856).

If the health status information at the current time step does not indicate a fault or failure of the control device 106*, the shadow control system 105 continues monitoring the control device 106*.

If the health status information at the current time step does indicate a fault or failure of the control device 106*, the shadow control system 105 proceeds to process (856).

The shadow control system 105 then elects, from the shadow control system 105, a new control device 106** to be configured as the main control device 104 (868).

For example, the shadow control system 105 can implement a voting system, e.g., a ranked voting system satisfying a Condorcet criterion, to elect the new control device 106** to be configured as the main control device 104.

The shadow control system 105 may implement a ranked voting system as follows. Each control device 106 in the shadow control system 105 can rank each other control device 106 in the shadow control system 105 based on a quality of a respective communication channel 15 (e.g., a wireless communication channel) of the other control device 106 with the control device 106. The shadow control system 105 can then determine, from the respective rankings of each control device 106 in the shadow control system 105, a respective aggregate rank of each control device 106 in the shadow control system 105. The shadow control system 105 can then elect, to be configured as the main control device 104, the control device 106 in the shadow control system 105 having the highest aggregate rank. Using such a procedure, the shadow control system 105 can elect the control device 106 that has the best connection to all the control devices 106 in the shadow control system 105.

When satisfying a Condorcet criterion, the ranked voting system elects the control device 106 who wins a majority of the vote in every head-to-head election against each of the other control devices 106 in the shadow control system 105. In other words, the elected control device 106 is the "Condorcet winner" that is preferred by a majority of the control devices 106 in the shadow control system 105. The shadow control system 105 may use preferential ranked, rated vote ballots, or explicit votes between all pairs of control devices 106 in the shadow control system 105. For example, similar to above, the shadow control system 105 can employ a single round of preferential voting, where each control device 106 ranks each of the other control devices 106 in the shadow control system 105 from most (e.g., marked as number 1) to least preferred (e.g., marked with a higher number). The shadow control system 105 can then tally the rankings to find a winner based on their aggregate rank. The shadow control system 105 will elect the Condorcet winner, if there is one, when the ranked voting system satisfies the Condorcet criterion.

Figure 9A:
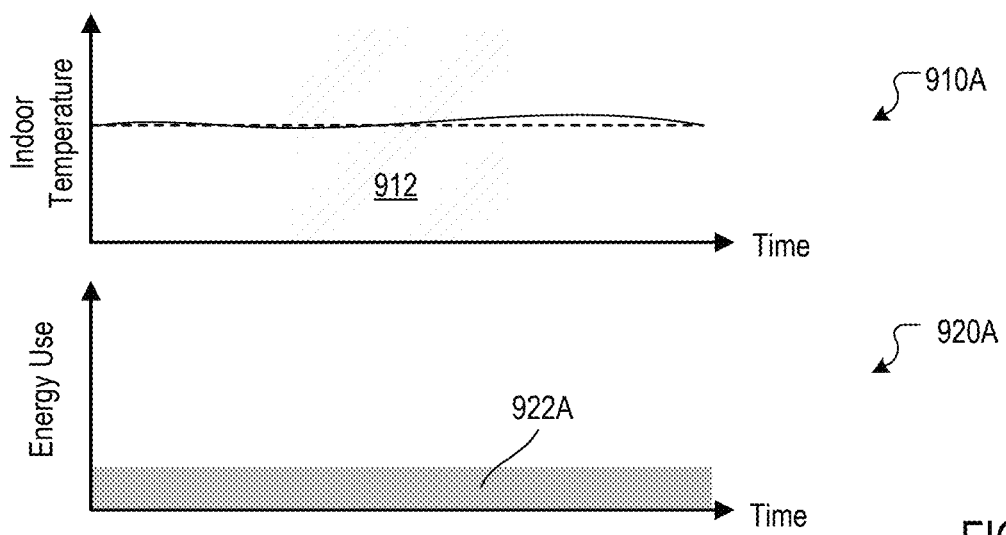
FIGS. 9A-9C are plots depicting indoor temperature and energy usage versus time for different heat pump control sequences.
Figure 9B:
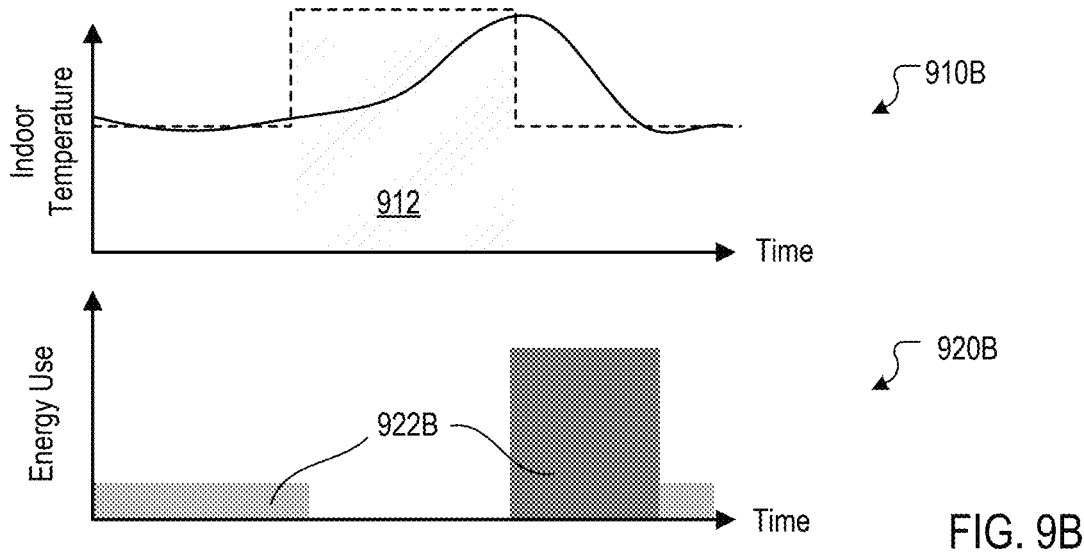
Figure 9C:
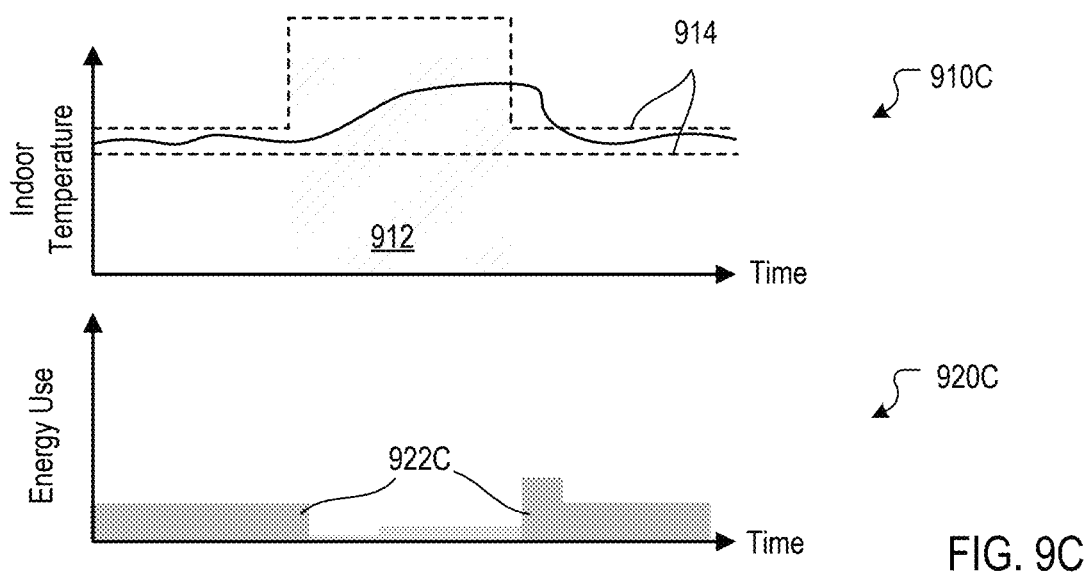

FIGS. 9A-9C include plots depicting indoor temperature of an indoor space 520 and energy usage versus time for different heat pump control sequences when the indoor space 520 is unoccupied for an away period 912.

FIG. 9A includes plots 910A and 920A of indoor temperature and energy usage, respectively, versus time for a control sequence that uses a constant but nonoptimal amount of energy 922A over the control sequence, including the away period 912.

FIG. 9B includes plots 910B and 920B of indoor temperature and energy usage, respectively, versus time for a control sequence that uses a variable but still nonoptimal amount of energy 922B over the control sequence. Particularly, the control sequence turns the heat pump off during the away period 912, e.g., based on a temperature schedule for the indoor space 520. This may save energy during the away period 912, but the energy savings are undone because of aggressive inefficient reconditioning when the schedule (or a user) sets a temperature setpoint back to a comfortable level.

FIG. 9C includes plots 910C and 920C of indoor temperature and energy usage, respectively, versus time for a control sequence, e.g., an optimal control sequence computed by the control system 102, that uses a variable and optimal (i.e., least) amount of energy 922C over the control sequence. Here, the control sequence instructs the heat pump to provide a small amount of cooling (e.g., preconditioning) to the indoor space 520 during the away period 912, as well as allowing the indoor temperature to swing within a control band 914.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random-access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A heat pump system, comprising:
  a set of heat pumps configured to transfer thermal energy to or from each of one or more spaces in accordance with a respective control input at each of a plurality of time steps;
  a plurality of sensors configured to collect status information of each of the one or more spaces over the time steps; and
  a control system comprising a plurality of control devices communicatively coupled with one another, the set of heat pumps, and the sensors, wherein:
  each control device comprises respective processing circuitry and associated memory,
  the control devices are distributed amongst a first control device and a shadow control system for the first control device,
  the first control device is configured as a main control device that is programmed to, at each time step:
    receive the status information at a current time step;
    compute the control input at the current time step based, at least in part, on the status information at the current time step; and
    transmit the control input at the current time step, and
  the shadow control system is programmed to:
    monitor health status information of the first control device over the time steps; and
    at each time step:
      determine whether the health status information at the current time step indicates a fault or failure of the first control device; and
      if so, elect, from the shadow control system, a second control device to be configured as the main control device.

2. The heat pump system of claim 1, wherein:
  the main control device is programmed with a system model comprising a thermal model of the one or more spaces,
  the thermal model characterizes a state of the one or more spaces at a sequential time step in response to: (i) a state of the one or more spaces at a given time step, and (ii) a given control input for the set of heat pumps at the given time step, and
  at each time step, computing the control input at the current time step based, at least in part, on the status information at the current time step comprises:
    determining, from the status information at the current time step, a state of the one or more spaces at the current time step;
    predicting, using the thermal model, a respective state of the one or more spaces at each of one or more future time steps in response to: (i) the state of the one or more spaces at the current time step, and (ii) a respective given control input for the set of heat pumps at each of the current and future time steps;

generating a cost function that depends on the states of the one or more spaces and given control inputs at each of the current and future time steps; and minimizing the cost function with respect to the given control inputs at each of the current and future time steps to determine the control input at the current time step.

3. The heat pump system of claim 2, wherein:

the main control device is programmed to receive a reference state trajectory comprising a respective reference state of the one or more spaces for each time step, and at each time step, the cost function comprises, for each of the current and future time steps, a respective error between: (i) the respective state of the one or more spaces, and (ii) the respective reference state of the one or more spaces, at the current or future time step.

4. The heat pump system of claim 3, wherein:

the main control device is programmed to receive a reference control sequence comprising a respective reference control input for each time step, and at each time step, the cost function comprises, for each of the current and future time steps, a respective error between: (i) the respective given control input, and (ii) the respective reference control input, at the current or future time step.

5. The heat pump system of claim 1, wherein each control device in the control system is programmed to, at each time step:

receive, from one or more of the sensors, a respective portion of the status information at the current time step;

transmit, to one or more heat pumps in the set, a respective portion of the control input at the current time step; and if the control device is not the first control device:

transmit, to the first control device, the respective portion of the status information at the current time step; and receive, from the first control device, the respective portion of the control input at the current time step.

6. The heat pump system of claim 1, wherein the shadow control system is programmed to:

run one or more shadow copies of the first control device over the time steps; and at each time step, if the health status information at the current time step indicates a fault or failure of the first control device, initialize the second control device with a shadow copy of the first control device at the current time step.

7. The heat pump system of claim 6, wherein each control device in the shadow control system is programmed to run a respective shadow copy of the first control device over the time steps.

8. The heat pump system of claim 1, wherein the control system is programmed to, before the first control device is configured as the main control device, perform one of the following operations:

receive, from a user control, a user input assigning the first control device to be configured as the main control device;

randomly select the first control device to be configured as the main control device; or elect the first control device to be configured as the main control device.

9. The heat pump system of claim 1, wherein the shadow control system is programmed to implement a voting system when electing the second control device to be configured as the main control device.

10. The heat pump system of claim 9, wherein the voting system is a ranked voting system, and implementing the ranked voting system comprises:

for each control device in the shadow control system:

ranking each other control device in the shadow control system based on a quality of a respective communication channel of the other control device with the control device;

determining, from the respective rankings of each control device in the shadow control system, a respective aggregate rank of each control device in the shadow control system; and electing, to be configured as the main control device, the control device in the shadow control system having the highest aggregate rank.

11. The heat pump system of claim 1, wherein the one or more spaces are a plurality of indoor spaces, and each heat pump in the set comprises:

one or more indoor units each configured to transfer thermal energy to or from one of the indoor spaces; and an outdoor unit thermally coupled to the one or more indoor units, the outdoor unit configured to transfer thermal energy to or from an outdoor space.

12. The heat pump system of claim 11, wherein each control device in the control system is housed in a corresponding one of the indoor units of the set of heat pumps.

13. The heat pump system of claim 2, wherein the sensors comprise one or more temperature sensors configured to collect status information characterizing a respective temperature of each of the one or more spaces.

14. The heat pump system of claim 2, wherein the thermal model comprises, for each of the one or more spaces, a respective thermal capacitance for the space and a respective thermal coupling between the space and each adjacent space.

15. The heat pump system of claim 11, wherein for each heat pump in the set:

each of the one or more indoor units of the heat pump comprises a respective indoor heat exchanger, the outdoor unit of the heat pump comprises an outdoor heat exchanger, a variable-speed compressor, and a reversing valve, and the heat pump comprises a respective electronic expansion valve for each of the one or more indoor units of the heat pump.

16. The heat pump system of claim 1, wherein the set of heat pumps is a singleton set.

17. A control system for a set of heat pumps configured to transfer thermal energy to or from each of one or more spaces in accordance with a respective control input at each of a plurality of time steps, wherein:

the control system comprises a plurality of control devices communicatively coupled with one another, each control device comprises respective processing circuitry and associated memory, the control devices are distributed amongst a first control device and a shadow control system for the first control device, the first control device is configured as a main control device that is programmed to, at each time step:

receive status information at a current time step characterizing each of the one or more spaces at the current time step;

compute the control input at the current time step based, at least in part, on the status information at the current time step; and transmit the control input at the current time step, and the shadow control system is programmed to:

monitor health status information of the first control device over the time steps; and at each time step:

determine whether the health status information at the current time step indicates a fault or failure of the first control device; and if so, elect, from the shadow control system, a second control device to be configured as the main control device.

18. The control system of claim 17, wherein the shadow control system is programmed to:

run one or more shadow copies of the first control device over the time steps; and at each time step, if the health status information at the current time step indicates a fault or failure of the first control device, initialize the second control device with a shadow copy of the first control device at the current time step.

19. A method performed by a control system for a set of heat pumps configured to transfer thermal energy to or from each of one or more spaces in accordance with a respective control input at each of a plurality of time steps, wherein:

the control system comprises a plurality of control devices communicatively coupled with one another, each control device comprises respective processing circuitry and associated memory, the control devices are distributed amongst a first control device and a shadow control system for the first control device, and the method comprises:

configuring the first control device as a main control device;

via the main control device, at each time step:

receiving status information at a current time step characterizing each of the one or more spaces at the current time step;

computing the control input at the current time step based, at least in part, on the status information at the current time step; and transmitting the control input at the current time step; and via the shadow control system:

monitoring health status information of the first control device over the time steps; and at each time step:

determining whether the health status information at the current time step indicates a fault or failure of the first control device; and if so, electing, from the shadow control system, a second control device to be configured as the main control device.

20. The method of claim 19, further comprising, via the shadow control system:

running one or more shadow copies of the first control device over the time steps; and at each time step, if the health status information at the current time step indicates a fault or failure of the first control device, initializing the second control device with a shadow copy of the first control device at the current time step.

* * * * *